(12) United States Patent
Sato et al.

(10) Patent No.: US 6,872,139 B2
(45) Date of Patent: Mar. 29, 2005

(54) INFORMATION PROCESSING SYSTEM

(75) Inventors: Masaki Sato, Kyoto (JP); Susumu Inoue, Kyoto (JP)

(73) Assignee: Nintendo Co., Ltd., Minami-ku Kyoto (JP)

( * ) Notice: Subject to any disclaimer, the term of this patent is extended or adjusted under 35 U.S.C. 154(b) by 219 days.

(21) Appl. No.: 09/988,217

(22) Filed: Nov. 19, 2001

(65) Prior Publication Data

US 2002/0098889 A1 Jul. 25, 2002

(30) Foreign Application Priority Data

Aug. 23, 2000 (JP) .......................... 2000-252968
Dec. 26, 2000 (JP) .......................... 2000-395340

(51) Int. Cl.$^7$ .......................................... A63F 13/00
(52) U.S. Cl. .................... 463/39; 463/1; 463/39; 463/47
(58) Field of Search .................... 463/1, 39, 47; 273/148 B; 345/161, 163, 168, 169; 700/83–85

(56) References Cited

U.S. PATENT DOCUMENTS

| | | | |
|---|---|---|---|
| 5,561,419 A | | 10/1996 | Sasaki et al. |
| 5,806,849 A | * | 9/1998 | Rutkowski ............ 463/39 |
| 5,838,307 A | | 11/1998 | Bouton |
| 5,854,621 A | * | 12/1998 | Junod et al. ............ 463/39 |
| 5,855,483 A | | 1/1999 | Collins et al. |
| 5,881,366 A | * | 3/1999 | Bodenmann et al. ...... 455/41.2 |
| 6,008,777 A | | 12/1999 | Yiu |

FOREIGN PATENT DOCUMENTS

JP    9 149984 A    6/1997

* cited by examiner

*Primary Examiner*—Derris H. Banks
*Assistant Examiner*—Robert Mosser
(74) *Attorney, Agent, or Firm*—Nixon & Vanderhye, PC

(57) ABSTRACT

When setting (changing) a reception mode in a receiving unit 40, a CPU 62 issues a reception mode command to the receiving unit 40. Having received the command, a serial interface 53 writes the command to a command buffer 52. A protocol controller 50 analyzes the command which has been written to the command buffer 52 to determine whether the reception mode is a FIX mode or an UNFIX mode, and writes a corresponding status (a device ID, unique ID, mode, etc.) to a status memory 54. Then, when data is received from a transmission unit 20, the receiving unit 40 refers to the status which has been written to determine whether or not the received data is from a transmission system which has been set.

29 Claims, 14 Drawing Sheets

F I G. 5

| SYSTEM ID | DEVICE ID | UNIQUE ID | DATA | BCH | CRC |
|---|---|---|---|---|---|

F I G. 6

| SYSTEM ID | DEVICE ID | UNIQUE ID | Valid Data FLAG | NEW DEVICE DETECTION FLAG | RECEPTION MODE FLAG | UNIQUE ID DESIGNATION FLAG |
|---|---|---|---|---|---|---|

F I G. 7

| SYSTEM ID | DEVICE ID | UNIQUE ID | DATA |
|---|---|---|---|

F I G. 8

| Valid Data FLAG | NEW DEVICE DETECTION FLAG | DATA |
|---|---|---|

INFORMATION PROCESSING SYSTEM

BACKGROUND OF THE INVENTION

1. Field of the Invention

The present invention relates to an information processing system, and more particularly to an information processing system which can be used for personal computers, game apparatuses, etc., for receiving and processing operation information which is wirelessly transmitted as data from a transmission device.

2. Description of the Background Art

Conventional personal computers, game apparatuses, and the like are generally operated by means of wired-type operation inputting devices (controllers, keyboards, etc.). However, wired-type operation inputting devices have a limited range of use due to the length of connection cords. Moreover, when a large number of wired-type operation inputting devices are connected, the connection cords may get entangled so that the neighborhood of the apparatus may become messy. Therefore, in recent years, various methods for coupling operation inputting devices (transmission devices) to the main body of an apparatus (a receiving device) via wireless communication have been proposed.

Conventional systems in which transmission devices are coupled to a receiving device via wireless communication are disclosed in Japanese Patent Laid-Open Publication No. 7-64718 and Japanese Patent Laid-Open Publication No. 11-134079, for example. In the techniques disclosed in these publications, an identification code is provided for each transmission device; the transmission devices wirelessly transmit data with individually-set identification codes appended thereto; and a receiving device outputs the received data to a processing section only when the identification code contained in the data which is wirelessly received coincides with a previously-set identification code (software processing).

However, in such a system where transmission devices and a receiving device are coupled via wireless communication, the transmission device side needs a transmission unit for transmitting wireless data, and the receiving device side needs a receiving unit for receiving the wireless data. The receiving unit can only receive wireless data which is transmitted from a specific transmission unit. Therefore, in the case where a plurality of transmission devices are used in conjunction with one receiving device in the aforementioned conventional system, it is necessary to provide a plurality of receiving units respectively corresponding to the plurality of transmission units, therefore presenting a problem in that the system becomes complicated and the cost increases. Moreover, in the aforementioned conventional system, the communication paths between the transmission units and the receiving unit are set in a fixed manner. Therefore, it is impossible to arbitrarily change the transmission units which are usable in conjunction with a receiving unit, so that it may be necessary to provide as many receiving units as there are transmission units to use. Moreover, the selection of transmission devices cannot be performed in an automatic (program-oriented) manner in accordance with the content of processing (software) performed by the receiving device. Thus, the receiving device cannot control the receiving unit as to the selection of the transmission devices to be used, etc.

SUMMARY OF THE INVENTION

Therefore, an object of the present invention is to provide an information processing system in which it is possible for a single receiving unit to receive and process wireless data from one or two or more arbitrary transmission units, and to arbitrarily change the selection of usable transmission units.

The present invention has the following features to attain the object above.

A first aspect of the present invention is directed to an information processing system for receiving and processing data transmitted from a transmission device (corresponding to a transmission system 1 in the embodiment) which wirelessly transmits operation information, the information processing system comprising a receiving device (a receiving unit 40) and a processing device (a game machine 60). The receiving device receives data transmitted from any transmission device and outputs the received data. The processing device performs a process based on the data outputted from the receiving device. The receiving device includes a receiving section (a first amplifier 41, a mixer 42, a VCO 43, a PLL processing section 44, a BPF 45, a second amplifier 46, a comparator 47, an oscillator 55), a criterion setting section (a status memory 54), and a determination section (a protocol controller 50). The receiving section receives data transmitted from any transmission device. The criterion setting section sets therein a criterion concerning processing of received data. The determination section determines whether or not the data received by the receiving section complies with the criterion which is set in the criterion setting section, and only outputs data which complies with the criterion to the processing device. The processing device includes a processing section (a CPU 62). The processing section performs a process which is in accordance with the operation information based on the data outputted from the receiving device. The receiving device and/or the processing device further includes a criterion changing section (the protocol controller 50 or CPU 62 for executing steps S101 and S611: hereinafter, only such step numbers will be given). The criterion changing section changes the criterion which is set in the criterion setting section.

In accordance with the structure of the present invention as described above, a criterion for determining the data which is received by the receiving device and outputted to the processing device can be changed by means of the criterion changing section. As a result, processible data is not limited to only the data from a specific transmission device, but rather the data from any transmission device can be received by one receiving device so that the data can be processed by the processing device.

Preferably, the criterion which is set in the criterion setting section is set in such a manner that only data which is in accordance with the processing device is outputted from the determination section.

Thus, among the data, the receiving device outputs to the processing device only the data which corresponds to the processing device, so that it can be selectively outputted over any data that is unrelated to the processing device.

Moreover, the criterion changing section included in the processing device preferably further includes a control information sending section (S401, S501, S701, and S801). The control information sending section sends to the receiving device control information for changing the criterion which is set in the criterion setting section. The determination section further determines whether or not the data received by the receiving section complies with the criterion which is set in the criterion setting section, and outputs only data which complies with the criterion to the processing device.

Thus, the transmission device which is to be received by the receiving device and whose data can be outputted to the processing device can be changed by using the control information which is sent from the control information sending section. As a result, it is possible to control the data outputted from the receiving device by means of the processing device.

Furthermore, the control information sending section may send the control information to the receiving device to ensure that only data which is in accordance with a process to be performed is outputted from the determination section.

In this case, the processing device can control the receiving device so that only the data which is in accordance with the process to be performed will be outputted from the receiving device, and the content of processing which can be performed in the processing device can be varied on the basis of the transmission device.

Moreover, the receiving section may receive via time-sharing the data transmitted from any plurality of transmission devices, and the control information sending section may send the control information to the receiving device to ensure that the data received by the receiving section via time-sharing is outputted to the processing device.

In this case, by processing data from any plurality of transmission devices via time-sharing, the data which are outputted from the plurality of transmission devices via time-sharing can be received by one receiving device, and a plurality of such data can be processed by the processing device.

Moreover, preferably, at least information concerning an identification code of the transmission device transmitted as data together with the operation information is set as the criterion in the criterion setting section. The determination section determines whether or not the identification code contained in the data received by the receiving section and the information concerning the identification code which is set in the criterion setting section satisfy a predetermined relationship.

Thus, instead of checking the identification code through software processing as in conventional practice, it is possible to check the identification code at the point where the receiving device receives data (hardware processing). As a result, the determination as to whether it is the transmission device that has been set can be made rapidly and accurately.

The information concerning the identification code which is set in the criterion setting section may be based on the identification code transmitted together with the operation information which is first received by the receiving section.

In this case, since the identification code which is first received by the receiving section is set in the criterion setting section, only the operation information from the transmission device having the first-received identification code will thereafter be outputted to the processing device. As a result, the information processing system can be operated while eliminating the effects of disturbances such as any other transmission devices or noise.

Moreover, the receiving device preferably further includes a display section (an LED 57) for indicating an interfered state in response to a result of the determination by the determination section.

Thus, the display section displays a result of the determination by the determination section, so that a current state of reception can be easily displayed. Moreover, by confirming whether or not the display by the display section switches with the same timing as the operation timing of the transmission device, it is possible to confirm whether or not the transmission device is the cause of the interference.

Moreover, the processing device is preferably capable of executing a first program for performing a process which is based on the data transmitted from first transmission device and a second program for performing a process which is based on the data transmitted from second transmission device, and the control information sending section sends first control information for setting a criterion corresponding to the first transmission device when the first program is executed by the processing device, and second control information for setting a criterion corresponding to the second transmission device when the second program is executed by the processing device, to the receiving device.

Thus, depending on the program to be executed by the processing device, the criterion which is set in the criterion setting section, i.e., the transmission device to be used can be changed automatically (on a programming basis). As a result, it is possible to selectively employ the optimum transmission device which is in accordance with the program, from among a plurality of transmission devices.

In one example, the first control information is information for setting one specific transmission device as the first transmission device, and the second control information is information for setting a specific plurality of transmission devices as the second transmission devices.

In this case, it is possible to set in the receiving device whether only the data from a specific transmission device will be received or data from a specific plurality of transmission devices will be received.

In another example, the first transmission device which is set by the first control information is of a type different from the type of the second transmission device which is set by the second control information.

In this case, data from different types of transmission devices can be received at the receiving device.

In a preferable embodiment, the receiving device is detachable from the processing device.

In this case, since the receiving device is detachable, it is possible for a single receiving device to be used in conjunction with a plurality of processing devices. As a result, there is no need to provide a plurality of transmission or receiving devices for realizing wireless communication, whereby the cost associated with the overall system can be reduced.

Moreover, in a preferable embodiment, the transmission device is separable into an inputting section (an operation section 10) for inputting operation data and a transmission section (a transmission unit) for generating transmission data from the operation data and wirelessly transmitting the transmission data.

In this case, since the inputting section and the transmission section of the transmission device can be separated, it is possible to employ a plurality of inputting sections for a single transmission section. As a result, there is no need to provide a plurality of transmission or receiving devices for realizing wireless communication, whereby the cost associated with the overall system can be reduced.

A second aspect of the present invention is directed to an information processing system for receiving and processing data transmitted from a transmission device which wirelessly transmits operation information, the information processing system comprising a receiving device and a processing device. The receiving device receives data transmitted from any transmission device and outputs the received data. The processing device performs a process based on the data outputted from the receiving device. The receiving device includes a receiving section, a criterion setting section, and a determination section. The receiving section receives data transmitted from any transmission device. The criterion setting section sets therein a criterion concerning processing of received data. The determination section determines whether or not the data received by the receiving section complies with the criterion which is set in the criterion setting section, and only outputs data which complies with the criterion to the processing device. The processing device includes a processing section, an identification code storage section (an ID memory 67), an identification code determination section (S703 and S803), and a criterion changing section. The processing section performs a process which is in accordance with the operation information based on the data outputted from the receiving device. The identification code storage section sets therein an identification code of the transmission device transmitted as data together with the operation information. The identification code determination section determines whether or not the identification code contained in the data outputted from the receiving device and information concerning the identification code which is set in the identification code storage section satisfy a predetermined relationship. The criterion changing section changes the criterion which is set in the criterion setting section. The criterion changing section further includes a control information sending section. The control information sending section sends to the receiving device control information for changing the criterion which is set in the criterion setting section. The processing section performs a process which is in accordance with the operation information based on data which is among the data outputted from the receiving device and which is determined by the identification code determination section as satisfying the predetermined relationship.

In accordance with the above-described structure, a criterion for determining the data which is received by the receiving device and outputted to the processing device can be changed by means of the criterion changing section. As a result, processible data is not limited to only the data from a specific transmission device, but rather the data from any transmission device can be received by one receiving device so that the data can be processed by the processing device. Moreover, the transmission device which is to be received by the receiving device and whose data can be outputted to the processing device can be changed by using the control information which is sent from the control information sending section. As a result, it is possible to control the data outputted from the receiving device by means of the processing device. Furthermore, by determining whether or not an identification code which is set in the identification code storage section and an identification code contained in the data outputted from the receiving device satisfy a predetermined relationship in the processing device, only the data containing the identification code which is set in the identification code storage section can be performed by the processing device. Therefore, it is possible to perform processing while excluding data from anywhere but the transmission device that has been set.

Moreover, preferably, the identification code is set in the identification code storage section based on a plurality of operation information. Furthermore, the processing device may further include an operation procedure display section (an output display device 70) for indicating a procedure of a plurality of operations for deriving the plurality of operation information, and the identification code of the plurality of operation information which comply with the procedure of the plurality of operations indicated by the operation procedure display section may be set in the identification code storage section.

Thus, in the identification code storage section, an identification code from the operation information complying with a procedure of a plurality of operations indicated by the operation procedure display section is set. Therefore, the identification code is prevented from being set by unexpected data from another transmission device or the like, so that an identification code of the user's transmission device can be securely set.

A third aspect of the present invention is directed to an information processing system for receiving and processing data transmitted from a transmission device which wirelessly transmits operation information, the information processing system comprising a receiving device and a processing device. The receiving device receives data transmitted from any transmission device and outputs the received data. The processing device performs a process based on the data outputted from the receiving device. The receiving device includes a receiving section, a criterion setting section, and a determination section. The receiving section receives data transmitted from any transmission device. The criterion setting section sets therein a criterion concerning processing of received data. The determination section determines whether or not the data received by the receiving section complies with the criterion which is set in the criterion setting section, and only outputs data which complies with the criterion to the processing device. The processing device includes a processing section and an identification code storage section. The processing section performs a process which is in accordance with the operation information based on the data outputted from the receiving device. The identification code storage section sets therein an identification code of the transmission device transmitted as data together with the operation information. The receiving device and/or the processing device further includes a criterion changing section. The criterion changing section changes the criterion which is set in the criterion setting section. The criterion changing section further includes a control information sending section. The control information sending section sends to the receiving device control information for changing the criterion which is set in the criterion setting section. Furthermore, the control information sending section sends the control information with the identification code contained therein to the receiving device. The determination section determines whether or not the identification code contained in the data received by the receiving section and information concerning the identification code contained in the control information satisfy a predetermined relationship, and outputs only data which complies with the relationship to the processing device.

In accordance with the above-described structure, a criterion for determining the data which is received by the receiving device and outputted to the processing device can be changed by means of the criterion changing section. As a result, processible data is not limited to only the data from a specific transmission device, but rather the data from any transmission device can be received by one receiving device so that the data can be processed by the processing device. Moreover, the transmission device which is to be received by the receiving device and whose data can be outputted to the processing device can be changed by using the control information which is sent from the control information sending section. As a result, it is possible to control the data outputted from the receiving device by means of the processing device. Furthermore, by determining whether or not an identification code which is set in the identification code storage section and an identification code contained in the data transmitted from the transmission device satisfy a predetermined relationship in the receiving device, only the data containing the identification code which is set in the identification code storage section can be transmitted to the processing device. Therefore, it is possible to perform processing while excluding data from anywhere but the transmission device that has been set. Moreover, since the identification code is checked at the point where the receiving device receives data, the determination as to whether it is the transmission device that has been set can be made rapidly and accurately.

Moreover, preferably, the identification code is set in the identification code storage section based on a plurality of operation information. Furthermore, the processing device may further include an operation procedure display section for indicating a procedure of a plurality of operations for deriving the plurality of operation information, and the identification code of the plurality of operation information which comply with the procedure of the plurality of operations indicated by the operation procedure display section may be set in the identification code storage section.

Thus, in the identification code storage section, an identification code from the operation information complying with a procedure of a plurality of operations indicated by the operation procedure display section is set. Therefore, the identification code is prevented from being set by unexpected data from another transmission device or the like, so that an identification code of the user's transmission device can be securely set.

A fourth aspect of the present invention is directed to a game system for transmitting and receiving data via wireless communication, the game system comprising a game controller (a transmission system 1) and a game apparatus (a game machine 60). The game controller wirelessly transmits information of a game operation inputted from a user as data. The receiving unit receives data transmitted from any game controller and outputs the received data. The game apparatus performs a process based on the data outputted from the receiving unit. The game controller includes an operation section (an operation device 10) and a transmission unit (a transmission unit 20). Via the operation section, a game operation is inputted by a user. The transmission unit wirelessly transmits as data the information of the game operation inputted to the operation section. The receiving unit includes a receiving section, a criterion setting section, and a determination section. The receiving section receives data transmitted from any transmission unit. The criterion setting section sets therein a criterion concerning processing of received data. The determination section determines whether or not the data received by the receiving section complies with the criterion which is set in the criterion setting section, and only outputs data which complies with the criterion to the game apparatus. The game apparatus includes a processing section. The processing section performs a process which is in accordance with the information of the game operation based on the data outputted from the receiving unit. The receiving unit and/or the game apparatus includes a criterion changing section. The criterion changing section changes the criterion which is set in the criterion setting section.

In accordance with the structure of the present invention as described above, a criterion for determining the data which is received by the receiving unit and outputted to the game apparatus can be changed by means of the criterion changing section. As a result, processible data is not limited to only the data from a specific game controller, but rather the data from any game controller can be received by one receiving unit so that the data can be processed by the game apparatus.

The criterion which is set in the criterion setting section is preferably set in such a manner that only data which is in accordance with the game apparatus is outputted from the determination section.

Thus, among the data, the receiving unit outputs to the game apparatus only the data which corresponds to the game apparatus, so that it can be selectively outputted over any data that is unrelated to the game apparatus.

Moreover, the game controller preferably further includes a first identification code storage section (a device ID storage section 13 and a unique ID storage section 33) for storing an identification code of itself, and the criterion changing section included in the game apparatus further includes a control information sending section. The control information sending section sends to the receiving unit control information for changing the criterion which is set in the criterion setting section. The transmission unit transmits information concerning the identification code as data, together with the information of the game operation. A criterion concerning processing of received data, with at least the information concerning the identification code being contained in the criterion, is set in the criterion setting section. The determination section further determines whether or not the identification code contained in the data received by the receiving section and the information concerning the identification code which is set in the criterion setting section satisfy a predetermined relationship, and outputs only data which complies with the criterion to the game apparatus.

Thus, the game controller which is to be received by the receiving unit and whose data can be outputted to the game apparatus can be changed by using the control information which is sent from the control information sending section. As a result, it is possible to control the data outputted from the receiving unit by means of the game apparatus. Moreover, instead of checking the identification code through software processing as in conventional practice, it is possible to check the identification code at the point where the receiving unit receives data (hardware processing). As a result, the determination as to whether it is the game controller that has been set can be made rapidly and accurately.

Furthermore, the control information sending section may send the control information to the receiving unit to ensure that only data which is in accordance with a game to be performed is outputted from the determination section.

Thus, among the data, the receiving unit outputs to the game apparatus only the data which corresponds to the game apparatus, so that it can be selectively outputted over any data that is unrelated to the game apparatus.

The information concerning the identification code which is set in the criterion setting section may be based on the identification code contained in the data which is first received by the receiving section.

In this case, since the identification code which is first received by the receiving section is set in the criterion setting section, only the operation information from the game controller having the first-received identification code will thereafter be outputted to the game apparatus. As a result, the game system can be operated while eliminating the effects of disturbances such as any other game controllers or noise.

Moreover, the receiving unit preferably further includes a display section for indicating an interfered state in response to a result of the determination by the determination section.

Thus, the display section displays a result of the determination by the determination section, so that a current state of reception can be easily displayed. Moreover, by confirming whether or not the display by the display section switches with the same timing as the operation timing of the game controller, it is possible to confirm whether or not the game controller is the cause of the interference.

Moreover, the receiving section may receive via time-sharing the data transmitted from any plurality of transmission units, and the control information sending section may send the control information to the receiving unit to ensure that the data received by the receiving section via time-sharing is outputted to the game apparatus.

In this case, by processing data from any plurality of game controllers via time-sharing, the data which are outputted from the plurality of game controllers via time-sharing can be received by one receiving unit, and a plurality of such data can be processed by the game apparatus.

In a preferable embodiment, the receiving unit is detachable from the game apparatus.

In this case, since the receiving unit is detachable, it is possible for a single receiving unit to be used in conjunction with a plurality of game apparatuses. As a result, there is no need to provide a plurality of transmission or receiving units for realizing wireless communication, whereby the cost associated with the overall system can be reduced.

In one example, the game controller is separable into the operation section and the first identification code storage section, and the transmission unit. Moreover, in another example, the game controller is separable into the operation section, and the transmission unit and the first identification code storage section.

In this case, regardless of the structure of the game controller, the operation section and the transmission unit of the game controller can be separated, so that it is possible to employ a plurality of operation sections for a single transmission unit. As a result, there is no need to provide a plurality of transmission or receiving units for realizing wireless communication, whereby the cost associated with the overall system can be reduced.

A fifth aspect of the present invention is directed to a game system for transmitting and receiving data via wireless communication, the game system comprising a game controller, a receiving unit, and a game apparatus. The game controller wirelessly transmits information of a game operation inputted from a user as data. The receiving unit receives data transmitted from any game controller and outputs the received data. The game apparatus performs a process based on the data outputted from the receiving unit. The game controller includes an operation section, a transmission unit, and a first identification code storage section. Via the operation section, a game operation is inputted by a user. The transmission unit wirelessly transmits as data the information of the game operation inputted to the operation section. The first identification code storage section stores an identification code of itself. The receiving unit includes a receiving section, a criterion setting section, and a determination section. The receiving section receives data transmitted from any transmission unit. The criterion setting section sets therein a criterion concerning processing of received data. The determination section determines whether or not the data received by the receiving section complies with the criterion which is set in the criterion setting section, and only outputs data which complies with the criterion to the game apparatus. The game apparatus includes a processing section, a second identification code storage section (an ID memory 67), and an identification code determination section. The processing section performs a process which is in accordance with the information of the game operation based on the data outputted from the receiving unit. The second identification code storage section sets the identification code therein. The identification code determination section determines whether or not the identification code contained in the data outputted from the receiving unit and information concerning the identification code which is set in the second identification code storage section satisfy a predetermined relationship. The receiving unit and/or the game apparatus includes a criterion changing section. The criterion changing section changes the criterion which is set in the criterion setting section. The criterion changing section further includes a control information sending section. The control information sending section sends to the receiving unit control information for changing the criterion which is set in the criterion setting section. The transmission unit transmits information concerning the identification code as data, together with the information of the game operation. The processing section performs a process which is in accordance with the information of the game operation based on data which is among the data outputted from the receiving unit and which is determined by the identification code determination section as satisfying the predetermined relationship.

In accordance with the structure of the present invention as described above, a criterion for determining the data which is received by the receiving unit and outputted to the game apparatus can be changed by means of the criterion changing section. As a result, processible data is not limited to only the data from a specific game controller, but rather the data from any game controller can be received by one receiving unit so that the data can be processed by the game apparatus. Moreover, the game controller which is to be received by the receiving unit and whose data can be outputted to the game apparatus can be changed by using the control information which is sent from the control information sending section. As a result, it is possible to control the data outputted from the receiving unit by means of the game apparatus. Furthermore, by determining whether or not an identification code which is set in the second identification code storage section and an identification code contained in the data outputted from the receiving unit satisfy a predetermined relationship in the game apparatus, only the data containing the identification code which is set in the second identification code storage section can be executed by the game apparatus. Therefore, it is possible to perform processing while excluding data from anywhere but the game controller that has been set.

Moreover, preferably, the identification code is set in the second identification code storage section based on a plurality of data outputted from the receiving unit. Furthermore, the game apparatus may further include an operation procedure display section for indicating a procedure of a plurality of operations for deriving the plurality of data, and the identification code of the plurality of data which comply with the procedure of the plurality of operations indicated by the operation procedure display section may be set in the second identification code storage section.

Thus, in the second identification code storage section, an identification code from the operation information complying with a procedure of a plurality of operations indicated by the operation procedure display section is set. Therefore, the identification code is prevented from being set by unexpected data from another game controller or the like, so that an identification code of the user s game controller can be securely set.

A sixth aspect of the present invention is directed to a game system for transmitting and receiving data via wireless communication, the game system comprising a game controller, a receiving unit, and a game apparatus. The game controller wirelessly transmits information of a game operation inputted from a user as data. The receiving unit receives data transmitted from any game controller and outputting the received data. The game apparatus performs a process based on the data outputted from the receiving unit. The game controller includes an operation section, a transmission unit, and a first identification code storage section. Via the operation section, a game operation is inputted by a user. The transmission unit wirelessly transmits as data the information of the game operation inputted to the operation section. The first identification code storage section stores an identification code of itself. The receiving unit includes a receiving section, a criterion setting section, and a determination section. The receiving section receives data transmitted from any transmission unit. The criterion setting section sets therein a criterion concerning processing of received data. The determination section determines whether or not the data received by the receiving section complies with the criterion which is set in the criterion setting section, and only outputs data which complies with the criterion to the game apparatus. The game apparatus includes a processing section and a second identification code storage section. The processing section performs a process which is in accordance with information of a game operation based on the data outputted from the receiving unit. The second identification code storage section sets the identification code therein. The receiving unit and/or the game apparatus includes a criterion changing section. The criterion changing section changes the criterion which is set in the criterion setting section. The criterion changing section further includes a control information sending section. The control information sending section sends to the receiving unit control information for changing the criterion which is set in the criterion setting section. The transmission unit transmits information concerning the identification code as data, together with the information of the game operation. A criterion concerning processing of received data, at least containing information concerning the identification code, is set in the criterion setting section. The control information sending section sends to the receiving unit the control information containing the identification code which is set in the second identification code storage section. The determination section further determines whether or not the identification code contained in the data received by the receiving section and the information concerning the identification code contained in the control information satisfy a predetermined relationship, and outputs only data which complies with the relationship to the game apparatus.

In accordance with the above-described structure, a criterion for determining the data which is received by the receiving unit and outputted to the game apparatus can be changed by means of the criterion changing section. As a result, processible data is not limited to only the data from a specific game controller, but rather the data from any game controller can be received by one receiving unit so that the data can be processed by the game apparatus. Moreover, the game controller which is to be received by the receiving unit and whose data can be outputted to the game apparatus can be changed by using the control information which is sent from the control information sending section. As a result, it is possible to control the data outputted from the receiving unit by means of the game apparatus. Furthermore, by determining whether or not an identification code which is set in the second identification code storage section and an identification code contained in the data transmitted from the game controller satisfy a predetermined relationship in the receiving unit, only the data containing the identification code which is set in the second identification code storage section can be transmitted to the game apparatus. Therefore, it is possible to perform processing while excluding data from anywhere but the game controller that has been set. Moreover, since the identification code is checked at the point where the receiving unit receives data, the determination as to whether it is the game controller that has been set can be made rapidly and accurately.

Moreover, preferably, the identification code is set in the second identification code storage section based on a plurality of data outputted from the receiving unit. Furthermore, the game apparatus may further include an operation procedure display section for indicating a procedure of a plurality of operations for deriving the plurality of data, and the identification code of the plurality of data which comply with the procedure of the plurality of operations indicated by the operation procedure display section may be set in the second identification code storage section.

Thus, in the second identification code storage section, an identification code from the operation information complying with a procedure of a plurality of operations indicated by the operation procedure display section is set. Therefore, the identification code is prevented from being set by unexpected data from another game controller or the like, so that an identification code of the user s game controller can be securely set.

These and other objects, features, aspects and advantages of the present invention will become apparent from the following detailed description of the present invention when taken in conjunction with the accompanying drawings.

BRIEF DESCRIPTION OF THE DRAWINGS

FIG. 5 is a diagram illustrating an exemplary structure of a transmission frame outputted from the transmission system 1 according to the first and second embodiments of the present invention.

FIG. 6 is a diagram illustrating exemplary data stored in a status memory 54 according to the first and second embodiments of the present invention.

FIG. 7 is a diagram illustrating exemplary data stored in a frame buffer 49 according to the first and second embodiments of the present invention.

FIG. 8 is a diagram illustrating exemplary data stored in a data buffer 51 according to the first and second embodiments of the present invention.

DESCRIPTION OF THE PREFERRED EMBODIMENTS (First Embodiment)

Figure 1:
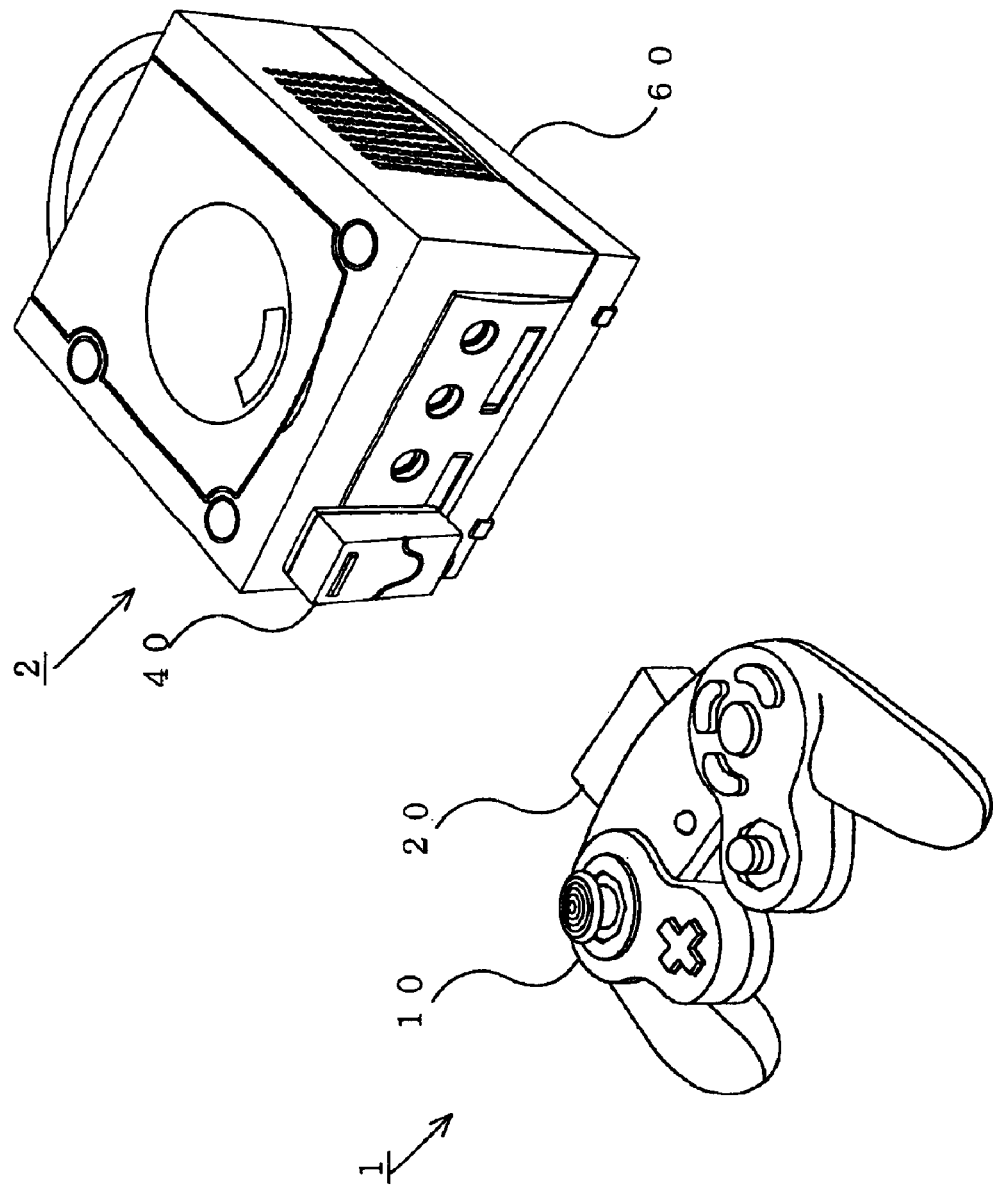
FIG. 1 is a perspective view illustrating an exemplary outlook of an information processing system according to first and second embodiments of the present invention.

FIG. 1 is a perspective view illustrating an exemplary outlook of an information processing system according to a first embodiment of the present invention. In FIG. 1, a transmission system 1 according to the present embodiment comprises an operation device 10 and a transmission unit 20. The receiving system 2 comprises a game machine 60 and a receiving unit 40.

Figure 2:
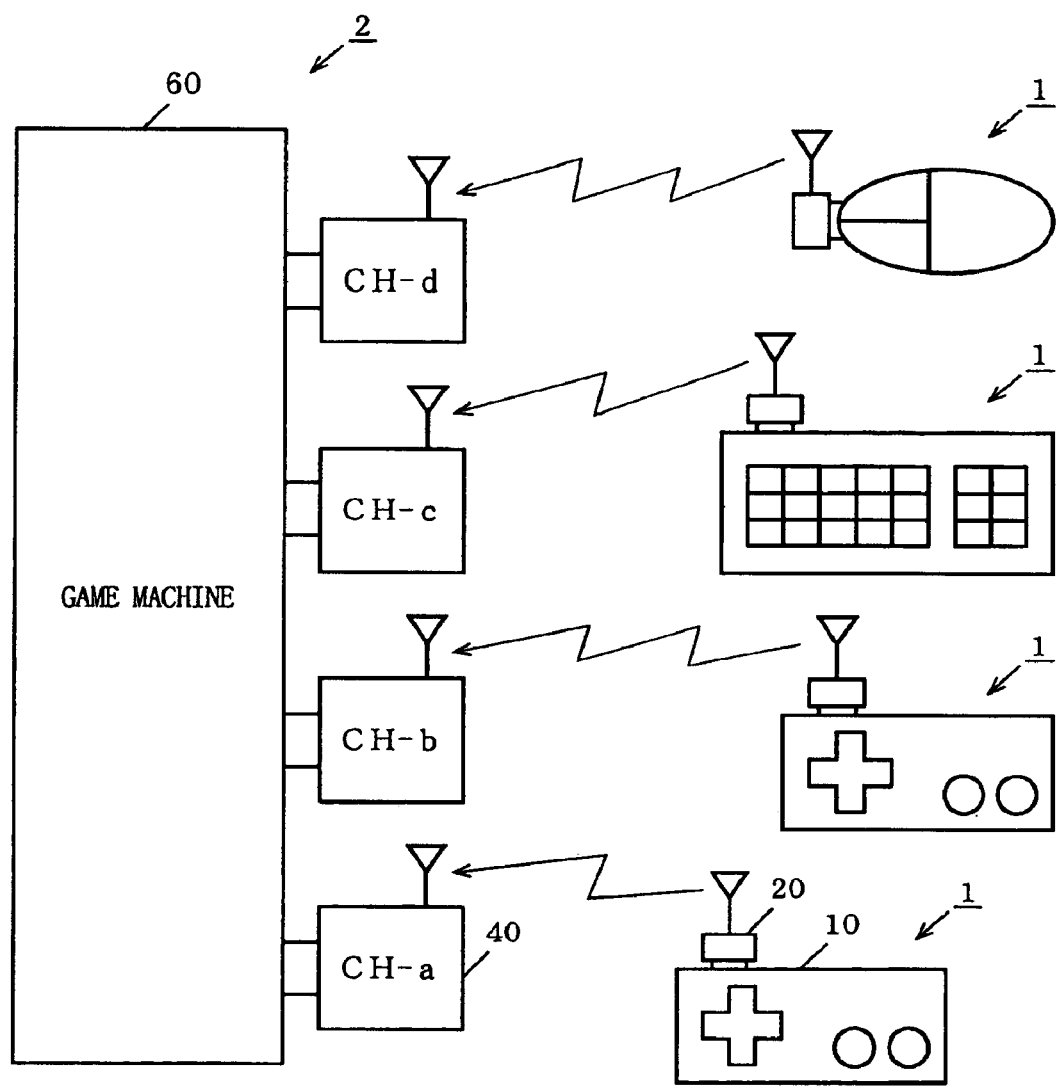
FIG. 2 is a block diagram illustrating an exemplary configuration employing the information processing system according to the first and second embodiments of the present invention.

FIG. 2 is a block diagram illustrating an exemplary configuration employing the information processing system according to the present embodiment. In FIG. 2, a receiving system 2 according to the present embodiment is coupled to a plurality of transmission systems 1 via wireless communication. Each transmission system 1 comprises an operation device 10 which is an operation inputting device such as a controller or a keyboard with mechanical portions such as a cross key and press buttons and a transmission unit 20 for wirelessly transmitting the data corresponding to operation contents which are inputted via the operation device 10. The receiving system 2 comprises at least one receiving unit 40 for receiving one piece of data or two or more data which are wirelessly transmitted from the transmission units 20, and a game machine 60 for performing predetermined processing based on the data received by the receiving units 40.

Preferably, the transmission unit 20 is arranged so as to be detachable from the operation device 10. Moreover, the receiving unit 40 is arranged so as to be detachable from the game machine 60. In accordance with such structure, it becomes possible to use identical transmission units 20 for a plurality of types of operation devices 10. It also becomes possible for a pair of the transmission unit 20 and the receiving unit 40 to be used in conjunction with another receiver. Note that the operation device 10 and the transmission unit 20, and the receiving unit 40 and the game machine 60, may be constructed integrally as the transmission system 1 and the receiving system 2, respectively.

Figure 3:
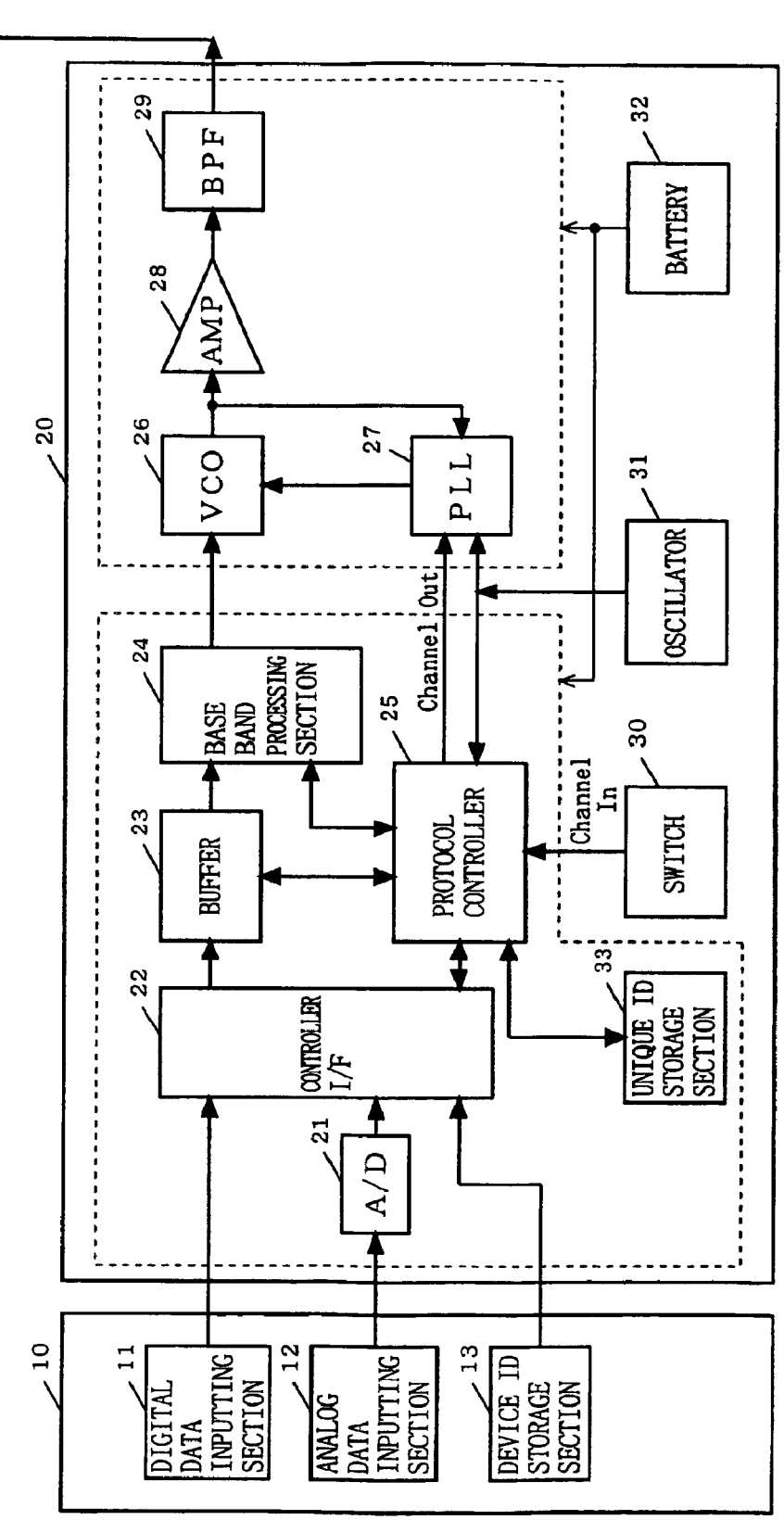
FIG. 3 is a block diagram illustrating an exemplary detailed structure of a transmission system 1 in FIG. 2 according to the first and second embodiments of the present invention.

Hereinafter, with further reference to FIG. 3 and FIG. 4, elements composing the transmission system 1 and the receiving system 2 will be described. FIG. 3 is a block diagram illustrating an exemplary detailed structure of a transmission system 1 in FIG. 2. In FIG. 3, the operation device 10 comprises a digital data inputting section 11, an analog data inputting section 12, and a device ID storage section 13. The transmission unit 20 comprises an A/D conversion section 21, a controller interface 22, a buffer 23, a base band processing section 24, a protocol controller 25, a unique ID storage section 33, a voltage controlled oscillator (VCO) 26, a PLL processing section 27, an amplifier 28, a band-pass filter (BPF) 29, a switch 30, an oscillator 31, and a battery 32.

Figure 4:
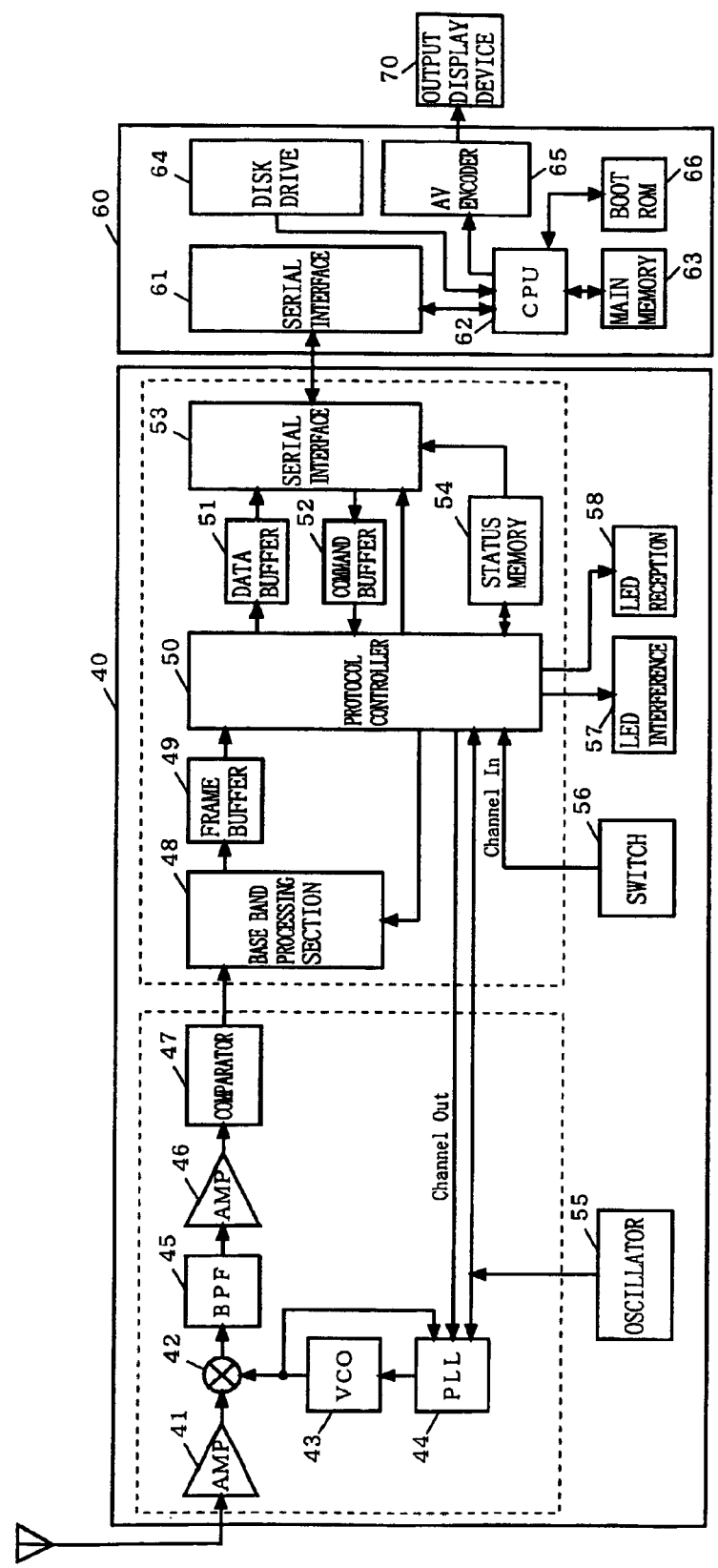
FIG. 4 is a block diagram illustrating an exemplary detailed structure of a receiving system 2 in FIG. 2 according to the first embodiment of the present invention.

FIG. 4 is a block diagram illustrating an exemplary detailed structure of a receiving system 2 in FIG. 2. In FIG. 4, the receiving unit 40 comprises, a first amplifier 41, a mixer 42, a VCO 43, a PLL processing section 44, a BPF 45, a second amplifier 46, a comparator 47, a base band processing section 48, a frame buffer 49, a protocol controller 50, a data buffer 51, a command buffer 52, a serial interface 53, a status memory 54, an oscillator 55, a switch 56, and light-emitting diodes (LED) 57 and 58. The game machine 60 comprises a serial interface 61, a CPU (central processing unit) 62, a main memory 63, a disk drive 64, an AV encoder 65, and a boot ROM 66.

In the transmission system 1, data concerning a digital operation is inputted the digital data inputting section 11. Data concerning an analog operation is inputted to the analog data inputting section 12. To the controller interface 22, the digital data which is outputted from the digital data inputting section 11 is directly inputted, and the analog data which is outputted from the analog data inputting section 12 is inputted after having been converted by the A/D conversion section 21 into digital data. The device ID storage section 13 stores a device ID (described later) of the transmission system 1. The device ID is outputted to the controller interface 22 together with the aforementioned digital/analog data. Note that the device ID may be stored on the transmission unit 20 side.

The controller interface 22 samples inputted data in accordance with an instruction from the protocol controller 25, and writes it to the buffer 23. The buffer 23 is a buffer for temporarily storing data. The base band processing section 24 generates a transmission frame by using the data stored in the buffer 23, and the transmission frame is subjected to direct sequence system modulation (DSSS modulation), which is a kind of spread spectrum method, for output. The protocol controller 25 is a state machine for controlling the controller interface 22, the buffer 23, the base band processing section 24, and a transmission channel frequency. Typically, the A/D conversion section 21, the controller interface 22, the buffer 23, the base band processing section 24, and the protocol controller 25 are realized by means of one base band-IC (integrated circuit). The switch 30, which is a switch (e.g., a rotary switch) for allowing a user to determine a wireless channel (Channel_In) on which to transmit data, permits selection from a plurality of wireless channels of different frequencies. The unique ID storage section 33 stores a unique ID (described later) of the transmission system 1. The unique ID is outputted to the protocol controller 25. Note that the unique ID may be stored on the operation device 10 side.

The VCO 26 has two functions, i.e., oscillation of a previously-set carrier frequency, and modulation of the carrier frequency using the transmission frame outputted from the base band processing section 24. The PLL processing section 27 performs a control to synchronize the carrier frequency oscillated by the VCO 26 with a system clock supplied from the oscillator 31. The value of the carrier frequency is determined by a set value (Channel_Out) of the wireless channel provided from the protocol controller 25. A modulated carrier frequency which is outputted from the VCO 26 is amplified by the amplifier 28, and after being subjected to band limitation by the BPF 29, wirelessly transmitted to the receiving unit 40, via an antenna. Typically, the VCO 26, the PLL processing section 27, the amplifier 28, and the BPF 29 are realized by means of one RF-IC.

In the receiving system 2, the modulated carrier frequency which is transmitted from the transmission system 1 is amplified by the first amplifier 41, via an antenna, and thereafter inputted to the mixer 42. The VCO 43 oscillates a previously-set carrier frequency. The PLL processing section 44 performs a control to synchronize the carrier frequency oscillated by the VCO 43 with a system clock supplied from the oscillator 55. The value of the carrier frequency is determined by a set value (Channel_Out) of the wireless channel provided from the protocol controller 50. The mixer 42 subjects the modulated carrier frequency outputted from the first amplifier 41 to frequency conversion using the carrier frequency outputted from the VCO 43, thereby extracting modulating data. The extracted analog modulating data is subjected to band limitation by the BPF 45, and after amplified by the second amplifier 46, digitized by the comparator 47. Typically, the first amplifier 41, the mixer 42, the VCO 43, the PLL processing section 44, the BPF 45, the second amplifier 46, and the comparator 47 are realized by means of one RF-IC.

The base band processing section 48 applies despreading processing to demodulate the transmission frame from the modulating data which has been digitized by the comparator 47. The frame buffer 49 is a buffer for temporarily storing the demodulated transmission frame. The protocol controller 50 is a state machine for controlling the base band processing section 48, the frame buffer 49, the data buffer 51, the command buffer 52, the serial interface 53, the status memory 54, the LEDs 57 and 58, and a reception channel frequency. The data stored in the frame buffer 49 is transferred to the data buffer 51 in accordance with an instruction from the protocol controller 50. The data buffer 51 may be of a double buffer structure. Commands which are transmitted from the game machine 60 are transferred to the command buffer 52. The command buffer 52 may be of a double buffer structure. The serial interface 53 carries out serials transfer of data between the receiving unit 40 and the game machine 60. Upon receiving a data read command from the game machine 60, the serial interface 53 transfers the data stored in the data buffer 51 to the game machine 60 under the instruction of the protocol controller 50. Moreover, upon receiving a status read command from the game machine 60, the serial interface 53 returns the content of the status memory 54 under the instruction of the protocol controller 50. The status memory 54 stores an operation mode of the receiving unit 40 and a status concerning the transmission system 1, and the like. Typically, the base band processing section 48, the frame buffer 49, the protocol controller 50, the data buffer 51, the command buffer 52, the serial interface 53, and the status memory 54 are realized by means of one base band-IC. The switch 56, which is a switch (e.g., a rotary switch) for allowing a user to determine a wireless channel (Channel_In) on which to receive data, permits selection from a plurality of wireless channels of different frequencies corresponding to the switch 30 of the transmission unit 20. The LED 57 is activated to indicate a state in which proper data reception is not occurring due to data interference. The LED 58 is activated to indicate a state in which proper data reception is occurring.

The serial interface 61 carries out serial transfers of data between the receiving unit 40 and the game machine 60. The CPU 62 takes care of overall control of the game machine 60, e.g., transmission of various commands to the receiving unit 40 and instructions to the disk drive 64 and the AV encoder 65. The main memory 63 stores various data which are necessary to the game machine 60. The boot ROM 66 stores a program which is necessary for an initial operation of the game machine 60. The disk drive 64 is a driving device for reading a program (game program) recorded on a disk (a DVD, a CD-ROM, etc.). The program which has been read is processed by the CPU 62. Although the disk drive 64 is included in the structure of the present example because a storage medium for recording the program is a disk, a ROM drive may be included in the structure in the case where the storage medium is a ROM. The AV encoder 65 performs video/audio processing based on the data transferred from the receiving unit 40, and outputs it to an output display device 70 such as a television set. The output display device 70 may be included within the game machine 60 (e.g., a device integrally comprising a television set and a game machine 60).

Next, the structure of the transmission frame used for the structure of the transmission frame from the transmission system 1 to the receiving system 2 will be described. FIG. 5 is a diagram illustrating an exemplary structure of a transmission frame outputted from the transmission system 1. In the transmission frame of FIG. 5, a system ID is an identification code which is given specifically to each type of game machine 60. For example, as a system ID for the game machine 60, a system ID "1" maybe given to "Super Nintendo Entertainment System", whereas a system ID "2" may be given to "NINTENDO64". Note that the system ID is previously stored in each transmission system 1 in a fixed manner. In other words, the game machine 60 which each transmission system 1 is intended for is predesignated. A device ID is an identification code which is given specifically to each type of operation device 10 (or specifically, the operation mechanism of the operation device 10) For example, a device ID "1" may be given to a "controller", a device ID "2" may be given to a "keyboard", and a device ID "3" may be given to a "joystick". A unique ID is an identification code which is given specifically to each operation device 10 or transmission unit 20, and is typically a serial number of production. Data is data which corresponds to the operation contents inputted by a user via the operation device 10. Although not particularly shown in the figure, the data includes an index bit, which is sequentially assigned to respective transmission frames. The index bit is used to confirm how many transmission data have been missed when the receiving system 2 fails to receive some transmission data due to interference, and to prevent the same transmission data from being read twice (which would happen in the case where the number of data writes performed by the receiving unit 40 is smaller than the number of data reads performed by the CPU 62). BCH is a bit used for error correction. CRC is a bit used for error detection.

The transmission frame thus constructed is transmitted from the transmission system 1 to the receiving system 2 on a wireless channel determined by the switch 30. As an initial setting for allowing the receiving system 2 to operate, it is necessary for the user to previously set the switches 30 and 56 so that wireless channel of the transmission unit 20 coincides with the wireless channel of the receiving unit 40 which is to receive the transmission frame transmitted from the transmission unit 20. By setting the wireless channel through this method, it is possible not only to employ the transmission units 20 and the receiving units 40 in a one-to-one correspondence, but also to employ a plurality of transmission units 20 and one receiving unit 40 in a plurality-to-one correspondence. In the latter case, according to the present example, data which are outputted from a plurality of transmission units 20 may be received by one receiving unit 40 via time-sharing so as to be executed therein.

Next, the processing which occurs between the receiving unit 40 and the game machine 60 in the receiving system 2 will be sequentially described. First, with reference to FIG. 6 to FIG. 8, the data stored in the status memory 54, the frame buffer 49, and the data buffer 51 will be described respectively.

FIG. 6 is a diagram illustrating exemplary data stored in the status memory 54. A system ID, a device ID and a unique ID are the respective identification codes described above. The system ID is written by the CPU 62 after the receiving system 2 is turned on. The device ID and the unique ID are written by a process of setting a reception mode, which will be described later. A Valid_Data flag is binary data which indicates whether the data stored in the data buffer 51 is valid or invalid. In the Valid_Data flag, "1" may be stored if the data is valid, and "0" may be stored if the data is invalid, for example. A new device detection flag is binary data indicating the case where data is received by the receiving system 2 for the first time, or where data is received from a transmission system 1 other than that from which data was being received up to the previous time. In the new device detection flag, "1" may be stored for the aforementioned case, and "0" may be stored for other cases, for example. Note that the new device detection flag is not used in a FIX mode, which will be described later. A reception mode flag is binary data indicating a mode in which the transmission source from which data can be received is specified as one transmission system 1 (FIX mode) or not specified (UNFIX mode). In the reception mode flag, "0" may be stored for the FIX mode, and "1" may be stored for the UNFIX mode, for example. A unique ID designation flag is binary data indicating whether a unique ID is designated in the case of the FIX mode. In the unique ID designation flag, "1" may be stored for the case where it is designated, and "1" may be stored for the case where it is not designated, for example.

FIG. 7 is a diagram illustrating exemplary data stored in the frame buffer 49. As shown in FIG. 7, the frame buffer 49 stores transmission data to which a predetermined error correction has been applied.

FIG. 8 is a diagram illustrating exemplary data stored in the data buffer 51. As shown in FIG. 8, the Valid_Data flag and the new device detection flag stored in the status memory 54 and the data stored in the frame buffer 49 are transferred to the data the buffer 51 so as to be stored therein. Note that the Valid_Data flag and the new device detection flag are loaded from the status memory 54 when the receiving unit 40 receives from the CPU 62 a data read command, which will be described later.

Accordingly, in the FIX mode, the receiving unit 40 transfers data from the frame buffer 49 to the data buffer 51 only when data from the transmission system 1 which is designated by the device ID, or by the device ID and the unique ID, is received. On the other hand, in the UNFIX mode, the receiving unit 40 transfers the received data from the frame buffer 49 to the data buffer 51 irrespective of the device ID and the unique ID. In either mode, however, the data is not transferred if the system ID is wrong.

Figure 9:
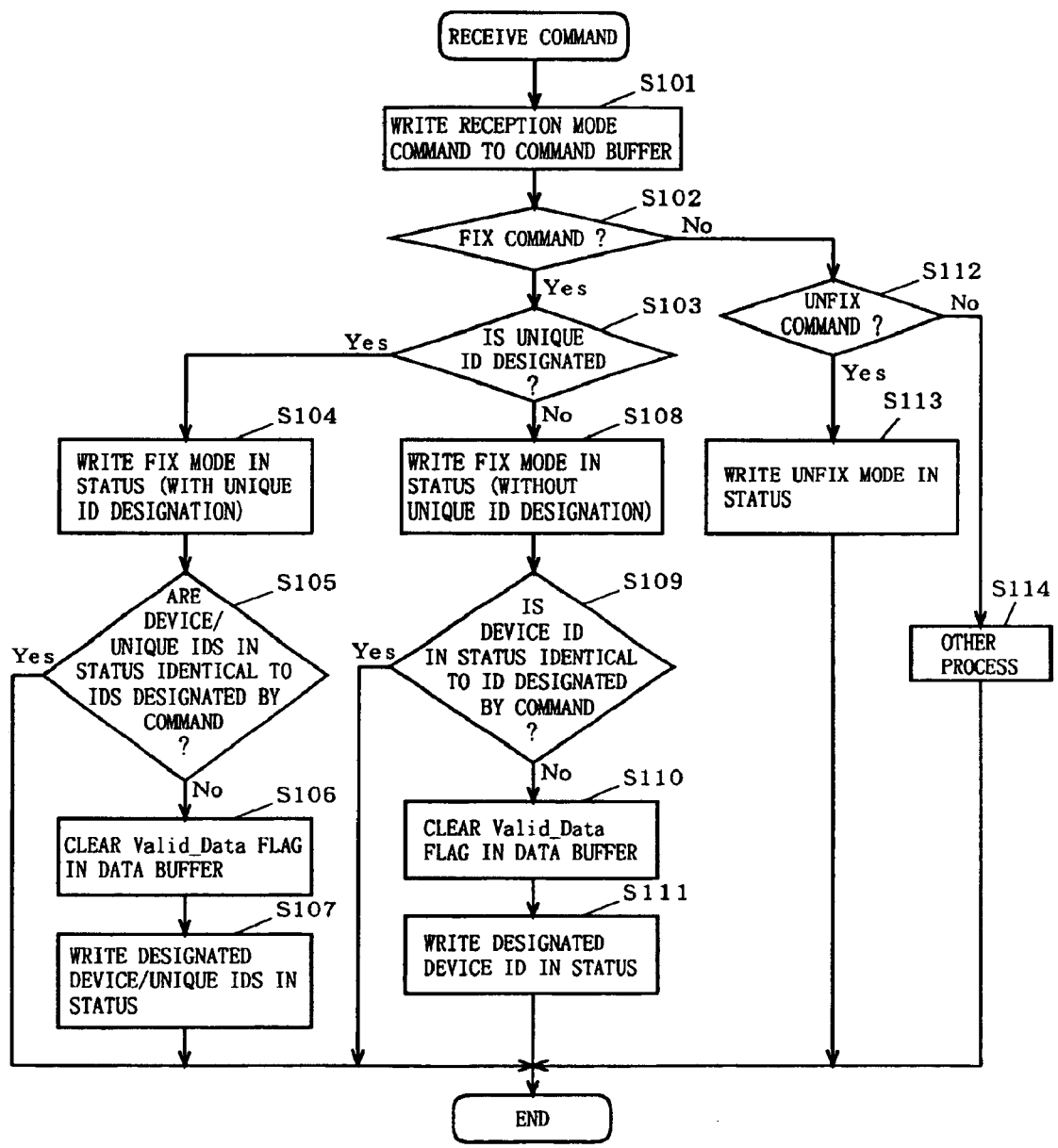
FIG. 9 is a flowchart illustrating an exemplary operation of a receiving unit 40 when receiving a reception mode command from a CPU 62 according to the first and second embodiments of the present invention.

Next, with reference to FIG. 9, the process of setting a reception mode, which occurs between the receiving unit 40 and the game machine 60, will be described. FIG. 9 is a flowchart illustrating an exemplary operation of the receiving unit 40 when receiving a command, especially a reception mode command, from the CPU 62.

As a premise, it is assumed that, when setting (changing) the reception mode in the receiving unit 40, the CPU 62 informs the receiving unit 40 of the reception mode to be set, by using a reception mode command. When the FIX mode is set, the reception mode command includes information of a unique ID, if needed, in addition to a device ID. The CPU 62 obtains the device ID and the unique ID of each transmission system 1 by receiving the data transmitted from the transmission system 1 at least once. The determination as to whether the reception mode is set to be FIX or UNFIX may be made in accordance with an instruction from the user, or in accordance with application software which is executed by the game machine 60.

Upon receiving the reception mode command, the serial interface 53 writes the command to the command buffer 52 (step S101) The protocol controller 50 analyzes the command which has been written to the command buffer 52 to determine if the reception mode is the FIX mode (step S102). If the FIX mode is determined at step S102, then the protocol controller 50 confirms whether or not a unique ID is designated (step S103). On the other hand, if the FIX mode is not determined at step S102, then the protocol controller 50 analyzes the command which has been written to the command buffer 52 to determine if the reception mode is an UNFIX mode (step S112). If the UNFIX mode is determined at step S112, then the protocol controller 50 sets the reception mode flag in the status memory 54 to "1" (step S113). On the other hand, if the UNFIX mode is not determined at step S112, then the protocol controller 50 performs a process which is in accordance with that command (step S114).

If step S103 finds that a unique ID is designated, then the protocol controller 50 sets the reception mode flag to "0", and the unique ID designation flag to "1", in the status memory 54 (step S104). Furthermore, the protocol controller 50 determines whether or not the device ID and the unique ID stored in the status memory 54 are identical to the device ID and the unique ID which are designated by the reception mode command (step S105). Then, only when determining at step S105 that both IDs are not identical, the protocol controller 50 clears the Valid_Data flag in the data buffer 51 (step S106), and writes to the status memory 54 the device ID and the unique ID which are designated by the reception mode command (step S107).

On the other hand, if step S103 finds that no unique ID is designated, then the protocol controller 50 sets the reception mode flag to "0", and the unique ID designation flag to "0", in the status memory 54 (step S108). Furthermore, the protocol controller 50 determines whether or not the device ID stored in the status memory 54 is identical to the device ID designated by the reception mode command (step S109). Then, only when determining at step S109 that the IDs are not identical, the protocol controller 50 clears the Valid_ Data flag in the data buffer 51 (step S110), and writes to the status memory 54 the device ID designated by the reception mode command (step S111). Through these processes, a reception mode desired by the game machine 60 is automatically set in the receiving unit 40.

Figure 10:
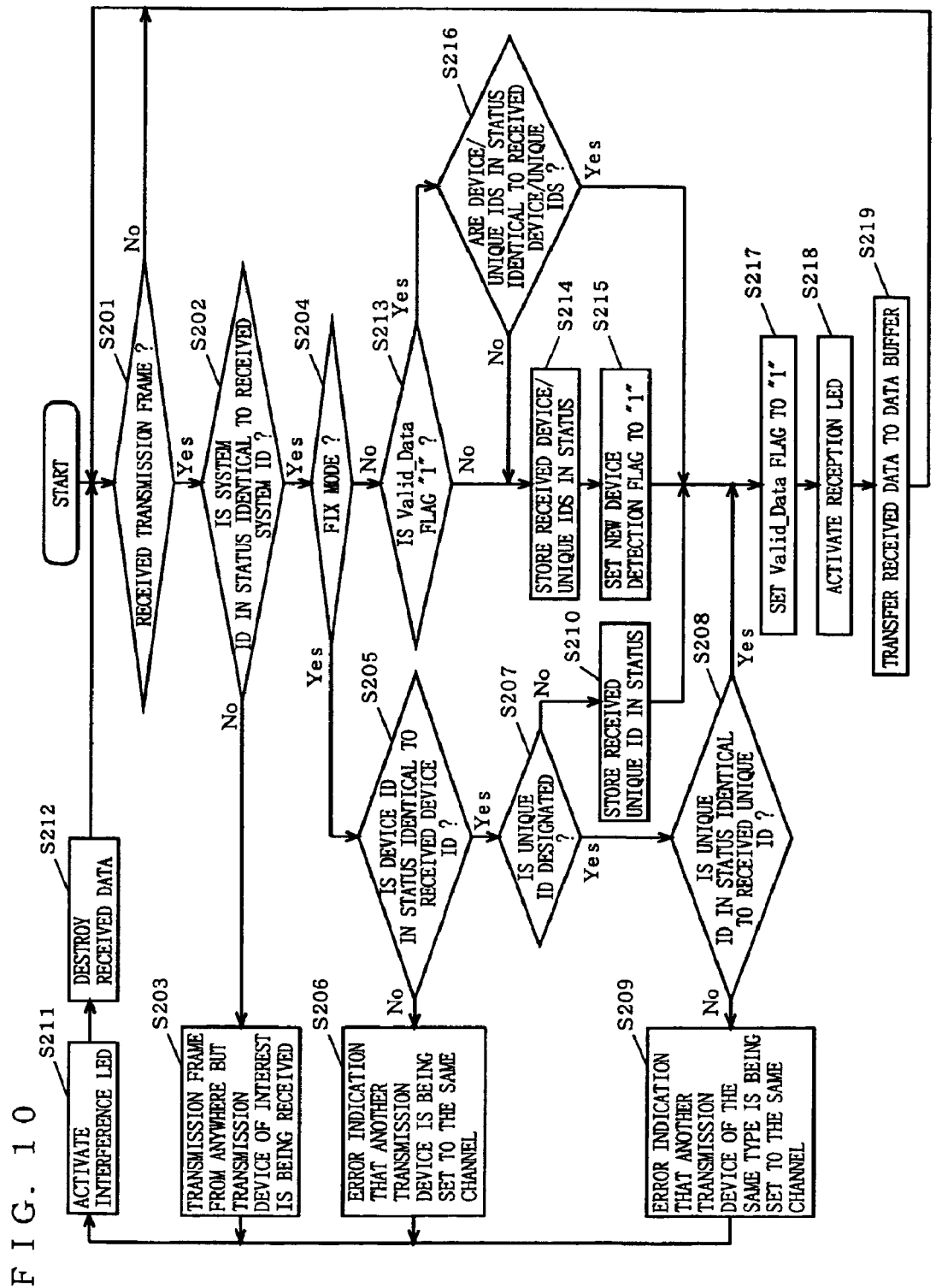
FIG. 10 is a flowchart illustrating an exemplary data processing operation performed by a protocol controller 50 in the receiving unit 40 when receiving data according to the first and second embodiments of the present invention.

Next, with reference to FIG. 10, data processing which is performed in the receiving system 2 when a transmission frame is received from the transmission system 1 will be described. FIG. 10 is a flowchart illustrating an exemplary data processing operation performed by the protocol controller 50.

First, the protocol controller 50 confirms whether a transmission frame has been received or not (step S201). If a transmission frame has been received, then the protocol controller 50 confirms whether or not the system ID of the received data stored in the frame buffer 49 coincides with the system ID stored in the status memory 54 (step S202). If the system IDs do not coincide at step S202, then the protocol controller 50 determines that it is data or noise of the same frequency which has been transmitted from a transmission device not corresponding to the game machine 60 (step S203), and activates the LED 57 for indicating an interfered state when the aforementioned data or noise of the same frequency is received by the receiving system 2 and destroys the received data (steps S211, S212). On the other hand, if the system IDs coincide at step S202, then the protocol controller 50 refers to the status memory 54 to confirm the reception mode which is currently set (step S204).

If the FIX mode is confirmed at step S204, then the protocol controller 50 confirms whether or not the device ID of the received data stored in the frame buffer 49 coincides with the device ID stored in the status memory 54 (step S205). If the device IDs do not coincide at step S205, the protocol controller 50 determines that another transmission system 1 is being set to the same wireless channel and that the transmission data therefrom is being received, and displays such an indication on a screen (step S206). Moreover, the protocol controller 50 activates the LED 57 for indicating an interfered state when the aforementioned transmission data is received by the receiving system 2 and destroys the received data (steps S211, S212). On the other hand, if the device IDs coincide at step S205, then the protocol controller 50 refers to the status memory 54 to further confirm whether or not a unique ID is set(step S207). Although an interfered state is displayed on the screen at step S206 described above, it is conceivable that the joy of the game may be undermined if errors are displayed on the screen during a game, etc., so it is not necessary to display errors on the screen in such cases.

If step S207 finds that no unique ID is set, the protocol controller 50 stores in the status memory 54 the unique ID of the received data stored in the frame buffer 49 (step S210), and sets the Valid_Data flag to "1" (step S217). Moreover, the protocol controller 50 activates the LED 58 for indicating a normal reception state, and causes the received data stored in the frame buffer 49 to be transferred to the data buffer 51 (steps S218, S219). On the other hand, if step S207 finds that a unique ID is set, the protocol controller 50 confirms whether or not the unique ID of the received data stored in the frame buffer 49 coincides with the unique ID stored in the status memory 54 (step S208). If the unique IDs do not coincide at step S208, then the protocol controller 50 determines that another transmission system 1 of the same type is being set to the same wireless channel and that the transmission data thereof is being received, and displays such an indication on the screen (step S209). Moreover, the protocol controller 50 activates the LED 57 for indicating an interfered state when the aforementioned transmission data is received by the receiving system 2 and destroys the received data (steps S211, S212). On the other hand, it the unique IDs coincide at step S208, the protocol controller 50 sets the Valid_Data flag in the status memory 54 to "1" (step S217). Then, the protocol controller 50 activates the LED 58 for indicating a normal reception state, and causes the received data stored in the frame buffer 49 to be transferred to the data buffer 51 (steps S218, S219). Although an interfered state is displayed on the screen at step S209 described above, it is conceivable that the joy of the game may be undermined if errors are displayed on the screen during a game, etc., so it is not necessary to display errors on the screen in such cases.

If the UNFIX mode is confirmed at step S204, the protocol controller 50 confirms the Valid_Data flag of the status memory 54 (step S213). If step S213 finds that the Valid_Data flag is "1", then the protocol controller 50 confirms whether or not the device ID and the unique ID of the received data stored in the frame buffer 49 coincide with the device ID and the unique ID stored in the status memory 54 (step S216).

If both the device IDs and the unique IDs coincide at step S216, then the protocol controller 50 sets the Valid_Data flag in the status memory 54 to "1" (step S217). Then, the protocol controller 50 activates the LED 58 for indicating a normal reception state, and causes the received data stored in the frame buffer 49 to be transferred to the data buffer 51 (steps S218, S219) On the other hand, if either the device IDs or the unique IDs do not coincide at step S216, or if step S213 finds that the Valid_Data flag is "0", then the protocol controller 50 stores in the status memory 54 the device ID and the unique ID of the received data stored in the frame buffer 49 (step S214), and sets both the Valid_Data flag and the new device detection flag to "1" (steps S215, S217). Then, the protocol controller 50 activates the LED 58 for indicating a normal reception state, and causes the received data stored in the frame buffer 49 to be transferred to the data buffer 51 (steps S218, S219).

In accordance with the information processing system of the present embodiment, as described above, based on the state of activation of the LED 57 for indicating an interfered state, a user can know the cause of interference. For example, while the user is using the receiving system 2 by operating the transmission system 1, if transmission data, noise, or the like from a transmission system 1 of the same frequency other than that transmission system 1 is received by the receiving system 2, then the LED 57 will be continuously activated or flicker with random timing. In other words, the LED 57 will be activated with timing unrelated to the operation by the user, so that the user will know that the receiving system 2 is suffering disturbances of the same frequency. In this case, the user is required to change the channels of the transmission system 1 and the receiving system 2 in order to use them.

On the other hand, while the user is using the receiving system 2 by operating the transmission system 1, if a transmission system of the same frequency other than that transmission system 1 is already set to the same wireless channel of the receiving system 2, then the LED 57 is activated with the same timing as the user operates the transmission system 1. In this case, the user will know that another transmission system has already been set to the same wireless channel of the receiving system 2, and is required to change the channel of the other transmission system, or change the channels of the user's transmission system 1 and the receiving system 2 in order to use them.

Figure 11:
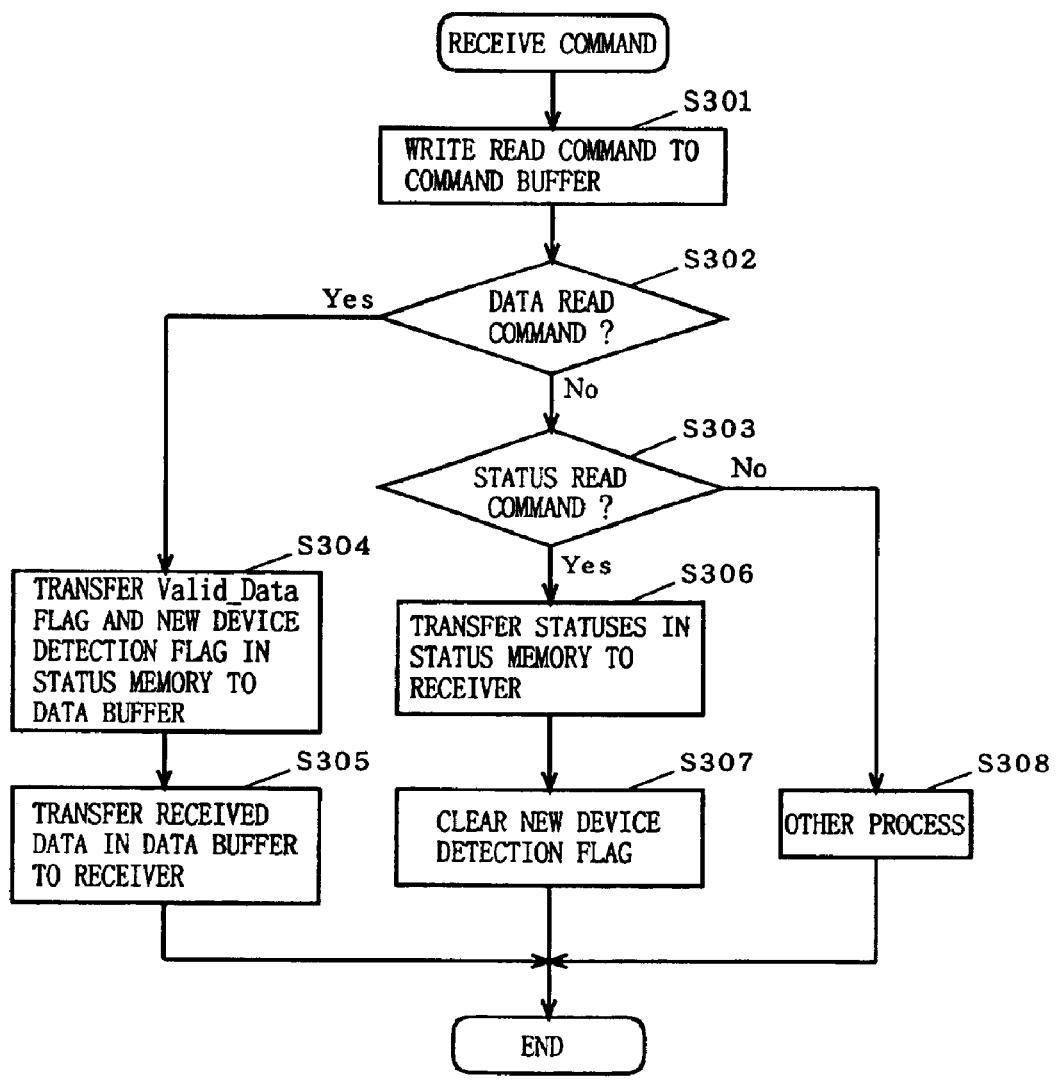
FIG. 11 is a flowchart illustrating an exemplary operation of the receiving unit 40 when receiving a data read command or a status read command from the CPU 62 according to the first and second embodiments of the present invention.

Next, with reference to FIG. 11 to FIG. 13, a process by the game machine 60 (CPU 62) of reading the data which has been transferred to the data buffer 51 through the above-described data processing operation will be described. FIG. 11 is a flowchart illustrating an exemplary operation of the receiving unit 40 when receiving a command, especially a data read command or a status read command, from the CPU 62.

As a premise, it is assumed that, the CPU 62 informs the receiving unit 40, by using a data read command when reading the data received by the receiving unit 40, and by using a status read command when reading the status stored in the status memory 54. Having received the data read or status read command, the serial interface 53 writes that command to the command buffer 52 (step S301). The protocol controller 50 analyzes the command written to the command buffer 52 to determine whether it is data read or status read (step S302, S303). If a data read command is determined through steps S302 and S303, then the protocol controller 50 transfers the Valid_Data flag and the new device detection flag in the status memory to the data buffer 51 (step S304). Then, the protocol controller 50 sends the data in the data buffer 51 to the game machine 60 via the serial interface 53 (step S305). If a status read command is determined through steps S302 and S303, then the protocol controller 50 sends all of the statuses in the status memory 54 to the game machine 60 via the serial interface 53 (step S306). Thereafter, the protocol controller 50 clears the new device detection flag in the status memory 54 (step S307). On the other hand, if neither command is determined through steps S302 and S303, then the protocol controller 50 performs a process which is in accordance with that command (step S308). Through these processes, the data received by the receiving unit 40 and the necessary statuses are sent to the game machine 60.

Figure 12:
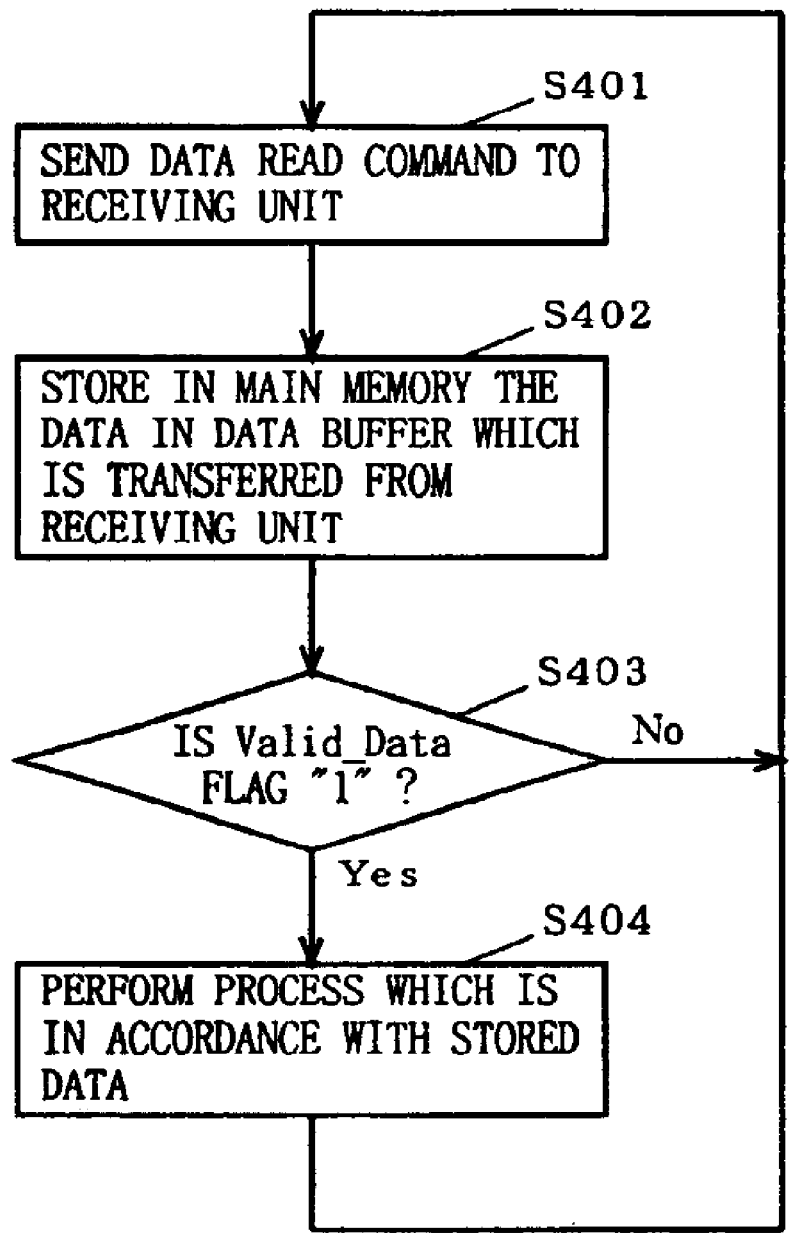
FIG. 12 is a flowchart illustrating an exemplary data read operation of the CPU 62 in a FIX mode according to the first embodiment of the present invention.

FIG. 12 is a flowchart illustrating an exemplary data read operation of the CPU 62 in the FIX mode. The CPU 62 sends a data read command to the receiving unit 40 (step S401). Thereafter, the CPU 62 receives the data which is transferred from the data buffer 51 of the receiving unit 40, and stores it in the main memory 63 (step S402). Next, the CPU 62 confirms the Valid_Data flag of the stored data (step S403). Then, the CPU 62 performs a process which is in accordance with the stored data (step S404) if step S403 finds that the Valid_Data flag is "1", or, if the Valid_Data flag is "0", determines that the data from the transmission system 1 which has been set is not yet received and sends a new data read command to the receiving unit 40 (step S401).

Figure 13:
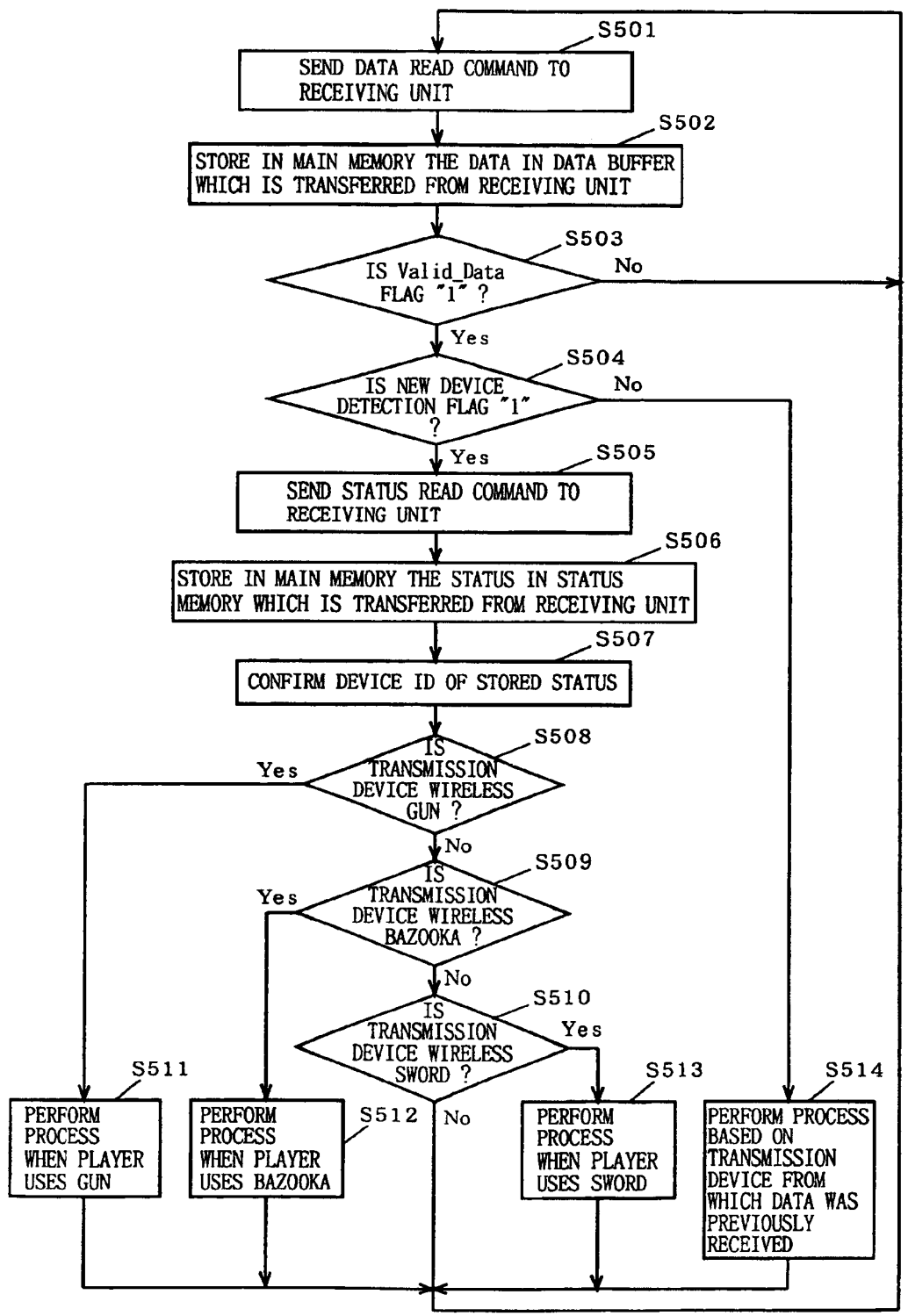
FIG. 13 is a flowchart illustrating an exemplary data read operation of the CPU 62 in an UNFIX mode according to the first embodiment of the present invention.

FIG. 13 is a flowchart illustrating an exemplary data read operation of the CPU 62 in the UNFIX mode. Note that FIG. 13 illustrates the case in which three types of transmission systems 1, i.e., a gun, a bazooka, and a sword, which are compatible with the game machine 60, are used.

The CPU 62 sends a data read command to the receiving unit 40 (step S501). Thereafter, the CPU 62 receives the data which is transferred from the data buffer 51 of the receiving unit 40, and stores it in the main memory 63 (step S502). Next, the CPU 62 confirms the Valid_Data flag of the stored data (step S503). If step S503 finds that the Valid_Data flag is "0", then the CPU 62 determines that any data from a valid transmission system 1 is not yet received, and sends a new data read command to the receiving unit 40 (step S501). On the other hand, if step S503 finds that the Valid_Data flag is "1", then the CPU 62 further confirms the new device detection flag of the stored data (step S504). If step S504 finds that the new device detection flag is "1", then the CPU 62 sends a status read command to the receiving unit 40 (step S505). Thereafter, the CPU 62 receives the status which is transferred from the status memory 54 of the receiving unit 40, and stores it in the main memory 63 (step S506). Next, the CPU 62 confirms the device ID of the stored status (step S507). Then, the CPU 62 performs a respective process corresponding to the transmission system 1 of the confirmed device ID (step S508 to S513). On the other hand, if step S504 finds that the new device detection flag is "0", the CPU 62 determines that the data has been received from the same transmission system 1 as the previous one, and performs a process corresponding to that transmission system 1 (step S514).

Thus, in accordance with the information processing system of the first embodiment, the receiving unit 40 can not only wirelessly communicate with a particular transmission unit 20, but also wirelessly communicate with a plurality of transmission units 20 via time-sharing. Moreover, the operation of the receiving unit 40 can be controlled with commands from the game machine 60 side. Furthermore, by arranging the operation device 10 so as to be detachable from the transmission unit 20 and arranging the receiving unit 40 so as to be detachable from the game machine 60, it becomes possible for a single transmission unit 20 and a single receiving unit 40 to be used in conjunction with a plurality of operation devices 10 and game machines 60. Moreover, when the receiving system 2 enters an interfered state, a user can infer the cause of the interference based on the state of activation of the LED 57 for indicating an interfered state, and therefore can take appropriate measures through a simple operation.

(Second Embodiment)

In accordance with the information processing system of the first embodiment, the receiving system can be operated by any transmission system. Therefore, it is conceivable that, when the receiving system is within the wireless coverage of another transmission system, the receiving system may be operated by the other transmission system. Hence, the second embodiment will illustrate an information processing system which is capable of registering in the game machine any transmission systems which are receivable to the receiving system by using the aforementioned unique IDs, so that operation by any other transmission systems can be prevented.

Firstly, the outlook view and the device structure according to the present embodiment are similar to those of the first embodiment which have been described with reference to FIG. 1 and FIG. 2 mentioned above. Therefore, the same reference numerals will be employed in the following description, while omitting any detailed descriptions thereof.

The transmission system 1 according to the present embodiment is also similar to that according to the first embodiment described with reference to FIG. 3 above. Therefore, the same reference numerals will be employed in the following description, while omitting any detailed descriptions thereof.

Figure 14:
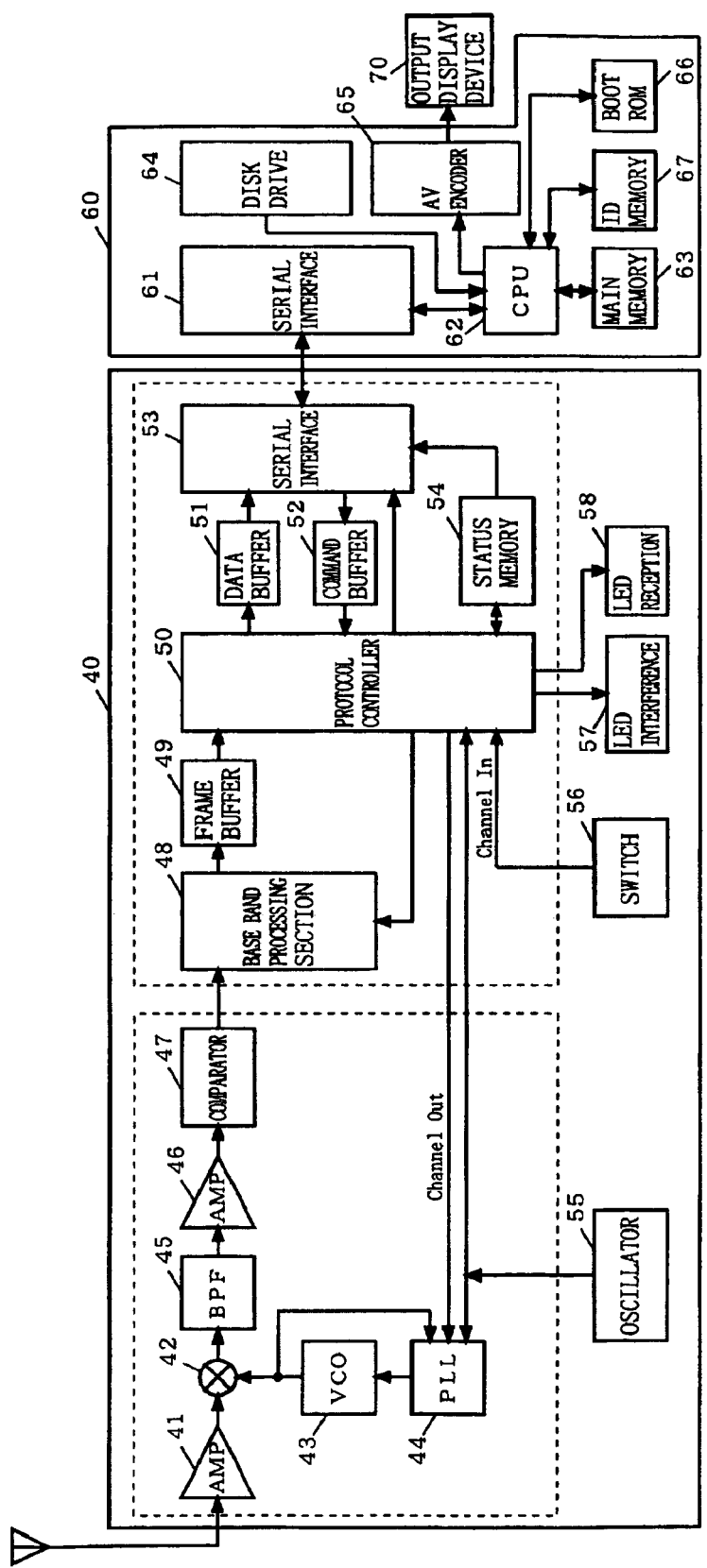
FIG. 14 is a block diagram illustrating an exemplary detailed structure of a receiving system 2 in FIG. 2 according to the second embodiment of the present invention.

FIG. 14 is a block diagram illustrating an exemplary detailed structure of the receiving system 2 according to the present embodiment. With reference to FIG. 14, according to the present embodiment, an ID memory 67 is added to the game machine 60 of the receiving system 2 according to the first embodiment. Since the other blocks are similar to those according to the first embodiment, the same blocks will be denoted by the same reference numerals, while omitting the descriptions thereof.

The ID memory 67 stores a device ID and a unique ID which are outputted from the CPU 62, and outputs the device ID and unique ID to the CPU 62 upon request from the CPU 62. Preferably, the ID memory 67 is composed of a flash ROM.

Moreover, the structure and transmission method of a transmission frame used for the data transmission from the transmission system 1 to the receiving system 2 according to the present embodiment are also similar to those according to the first embodiment described with reference to FIG. 5, and therefore the descriptions thereof are omitted.

Moreover, the processing occurring between the receiving unit 40 and the game machine 60 in the receiving system 2 and the process of setting a reception mode according to the present embodiment, as well as the data processing performed by the protocol controller 50 when a transmission frame is received from the transmission system 1, are also similar to those according to the first embodiment described with reference to FIG. 6 to FIG. 10, and therefore the descriptions thereof are omitted.

Next, a procedure of registering a unique ID in the game machine 60, which is added in the present embodiment, will be described with reference to FIG. 15. Note that FIG. 15 is a flowchart illustrating an exemplary procedure of registering device/unique IDs in the game machine 60.

Figure 15:
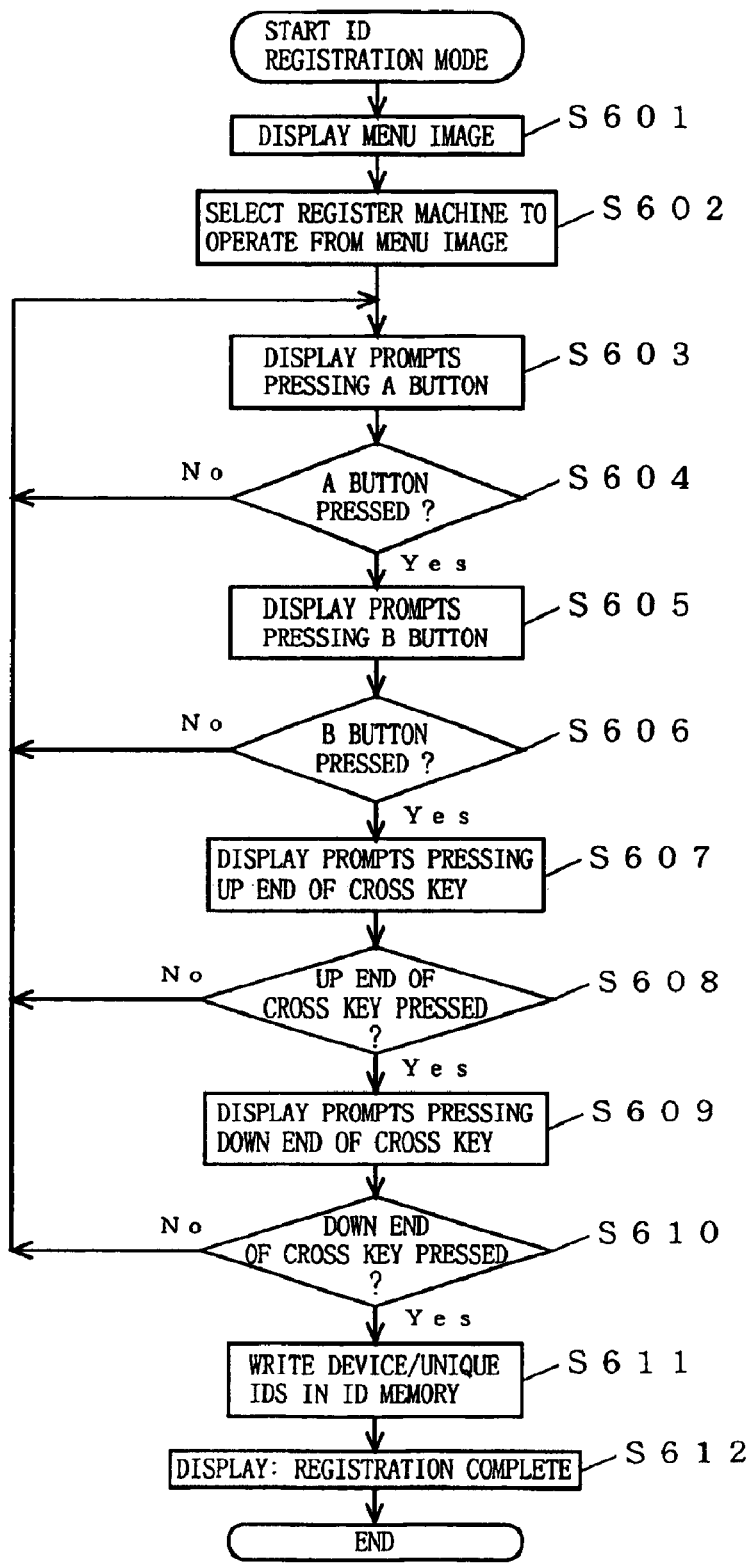
FIG. 15 is a flowchart illustrating a method for registering device/unique IDs of the transmission system 1 in a game machine 60 according to the second embodiment of the present invention.

FIG. 15 is a method in which the CPU 62 reads a menu displaying program and an ID registration program stored in the boot ROM 66 so as to indicate a procedure on the output display device 70 via the AV encoder 65, thereby allowing a user of the information processing system to register device/unique IDs of the transmission system 1. First, the CPU 62 reads the menu displaying program from the boot ROM 66 to display a menu image on the output display device 70 via the AV encoder 65 (step S601). Next, by operating the operation device 10, the user selects "Register transmission system" from the menu image, and selects a device corresponding to the operation device 10 from among transmission system types (step S602). Then, as the CPU 62 receives from the transmission system 1 data indicating that "Register transmission system" was selected at step S602, the ID registration program is started.

First, in order to direct induce a user operation so that an A button of the operation device 10 is pressed, the CPU 62 displays "Press A button" on the output display device 70 via the AV encoder 65 (step S603). Next, the CPU 62 confirms whether or not the data which has been transmitted from the transmission system 1 is data indicating that the A button has been pressed (step S604).

If step S604 finds that the data which has been transmitted from the transmission system 1 is data indicating that the A button has been pressed, then in order to induce a user operation so that a B button of the operation device 10 is pressed, the CPU 62 displays "Press B button" on the output display device 70 via the AV encoder 65 (step S605) On the other hand, if the data which has been transmitted from the transmission system 1 is not data indicating that the A button has been pressed, then the CPU 62 returns to step S603 to again display "Press A button" on the output display device 70 (step S603).

After proceeding to step S605, the CPU 62 confirms whether or not the data which has been transmitted from the transmission system 1 is data indicating that the B button has been pressed (step S606). If step S606 finds that the data which has been transmitted from the transmission system 1 is data indicating that the B button has been pressed, then, in order to induce a user operation so that the UP end of the cross key of the operation device 10 is pressed, the CPU 62 displays "Press the UP end of the cross key" on the output display device 70 via the AV encoder 65 (step S607). On the other hand, if the data which has been transmitted from the transmission system 1 is not data indicating that the B button has been pressed, then the CPU 62 returns to step S603 to again display "Press A button" on the output display device 70 (step S603).

After proceeding to step S607, the CPU 62 confirms whether or not the data which has been transmitted from the transmission system 1 is data indicating that the UP end of the cross key has been pressed (step S608). If step S608 finds that the data which has been transmitted from the transmission system 1 is data indicating that the UP end of the cross key has been pressed, then in order to induce a user operation so that the DOWN end of the cross key of the operation device 10 is pressed, the CPU 62 displays "Press the DOWN end of the cross key" on the output display device 70 via the AV encoder 65 (step S609). On the other hand, if the data which has been transmitted from the transmission system 1 is not data indicating that the UP end of the cross key has been pressed, then the CPU 62 returns to step S603 to again display "Press A button" on the output display device 70 (step S603).

After proceeding to step S609, the CPU 62 confirms whether or not the data which has been transmitted from the transmission system 1 is data indicating that the DOWN end of the cross key has been pressed (step S610). If step S610 finds that the data which has been transmitted from the transmission system 1 is data indicating that the DOWN end of the cross key has been pressed, then the CPU 62 reads the device/unique IDs from the data and writes them to the ID memory 67 (step S611). On the other hand, if the data which has been transmitted from the transmission system 1 is not data indicating that the DOWN end of the cross key has been pressed, then the CPU 62 returns to step S603 to again display "Press A button" on the output display device 70 (step S603).

After registering the device/unique IDs in the ID memory 67 at step S611, the CPU 62 displays "Registration complete" on the output display device 70 via the AV encoder 65 (step S612), and the ID registration program is ended.

Thus, the device/unique IDs are registered in the ID memory 67 which is internalized in the game machine 60. Note that, as mentioned earlier, the device ID is an identification code which is given specifically to each type of operation device 10, and the unique ID is an identification code which is given specifically to each operation device 10 or transmission unit 20. Therefore, the type of the operation device 10 and the individual data of the operation device 10 or the transmission unit 20 are registered in the game machine 60. Moreover, as mentioned earlier, in the case where the ID memory 67 is composed of a flash ROM, the game machine 60 can store the device/unique IDs in the form of data which is not erased even after the power is turned OFF, etc.

Although the ID registration in the present embodiment occurs as the user sequentially operates the A button, the B button, the UP end of the cross key, and the DOWN end of the cross key of the operation device 10 in accordance with displays on the output display device 70, the sequence, buttons, and keys are not limited thereto. This operation, in which buttons and keys which are in accordance with the type of operation device 10 for ID registration are selected, requires a user to make a number of button operations in accordance with the output display device 70 so as to ensure that only that user's operation device will have its IDs registered in the game machine 60, because, if the registration could be completed through a simple operation of the operation device 10, it would be possible for data from another user's operation device to be erroneously received for ID registration.

The flowchart dictates that, if the user makes a button operation which is different from the instruction from the output display device 70 during the ID registration operation, inputs must be made from the first operation by returning to step S603; however, the flowchart is not limited thereto. Depending on the type, etc., of the operation device for ID registration, a flowchart might be possible such that in response to the inputting of the aforementioned different operation, the instruction on the output display device 70 is repeated until that operation is properly executed, rather than having to again input from the first operation.

Next, with reference to FIG. 16 and FIG. 17, a process by the game machine 60 (CPU 62) of reading the data which has been transferred to the data buffer 51 will be described. The operation of the receiving unit 40 when receiving a command from the CPU 62, especially a data read command or a status read command, is similar to that of the first embodiment described with reference to FIG. 11, and therefore the description thereof is omitted.

Figure 16:
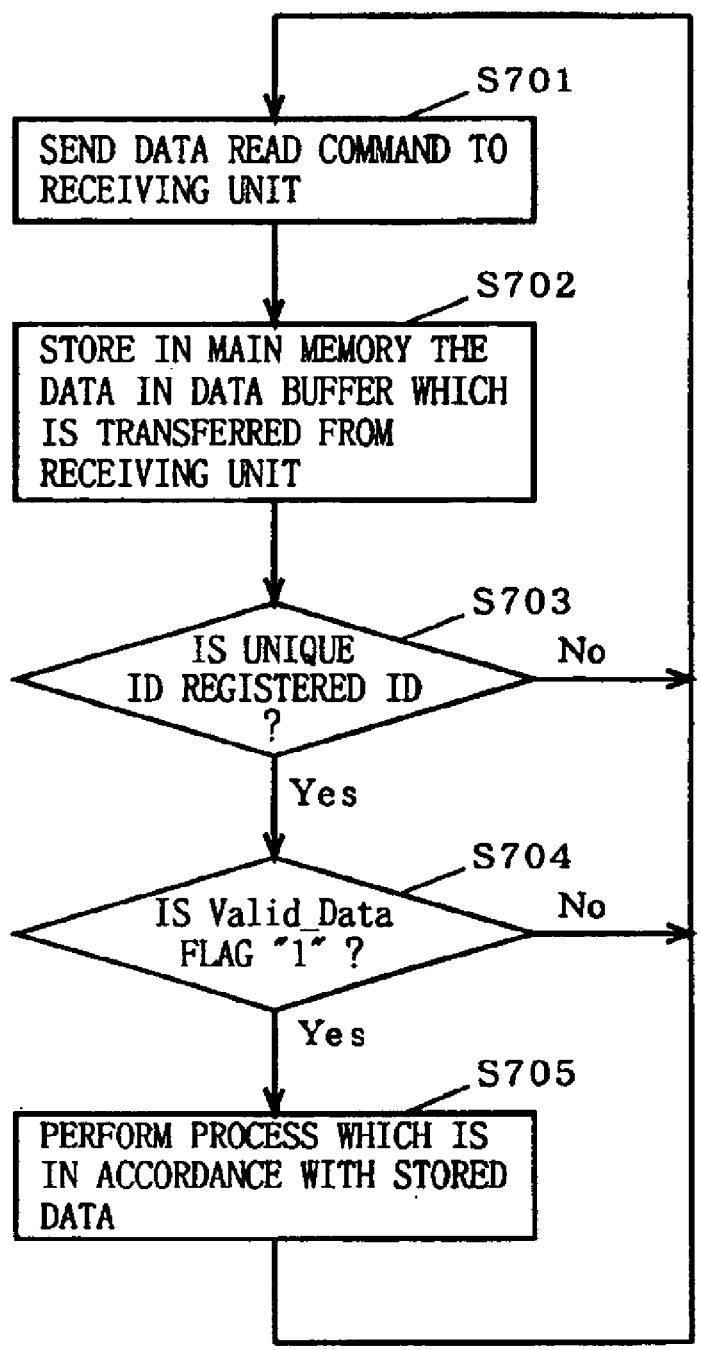
FIG. 16 is a flowchart illustrating an exemplary data read operation of the CPU 62 in a FIX mode according to the second embodiment of the present invention.

FIG. 16 is a flowchart illustrating an exemplary data read operation of the CPU 62 in the FIX mode. The CPU 62 sends a data read command to the receiving unit 40 (step S701). Thereafter, the CPU 62 receives data which is transferred from the data buffer 51 in the receiving unit 40, and stores it in the main memory 63 (step S702). Next, the CPU 62 confirms the unique ID of the stored data (step S703). Then, if the unique ID of the stored data coincides with the unique ID registered in the ID memory 67 at step S703, then the CPU 62 proceeds to step S704. On the other hand, if the unique ID of the stored data does not coincide with the unique ID registered in the ID memory 67 at step S703, then the CPU 62 determines that data from anywhere but the registered operation device 10 or transmission unit 20 has been received, and sends a new data read command to the receiving unit 40 (step S701). Next, the CPU 62 confirms the Valid_Data flag of the stored data (step S704). Then, the CPU 62 performs a process which is in accordance with the stored data (step S705) if step S704 finds that the Valid_Data flag is "1", or, if the Valid_Data flag is "0", determines that data from the transmission system 1 which has been set is not yet received and sends a new data read command to the receiving unit 40 (step S701).

Figure 17:
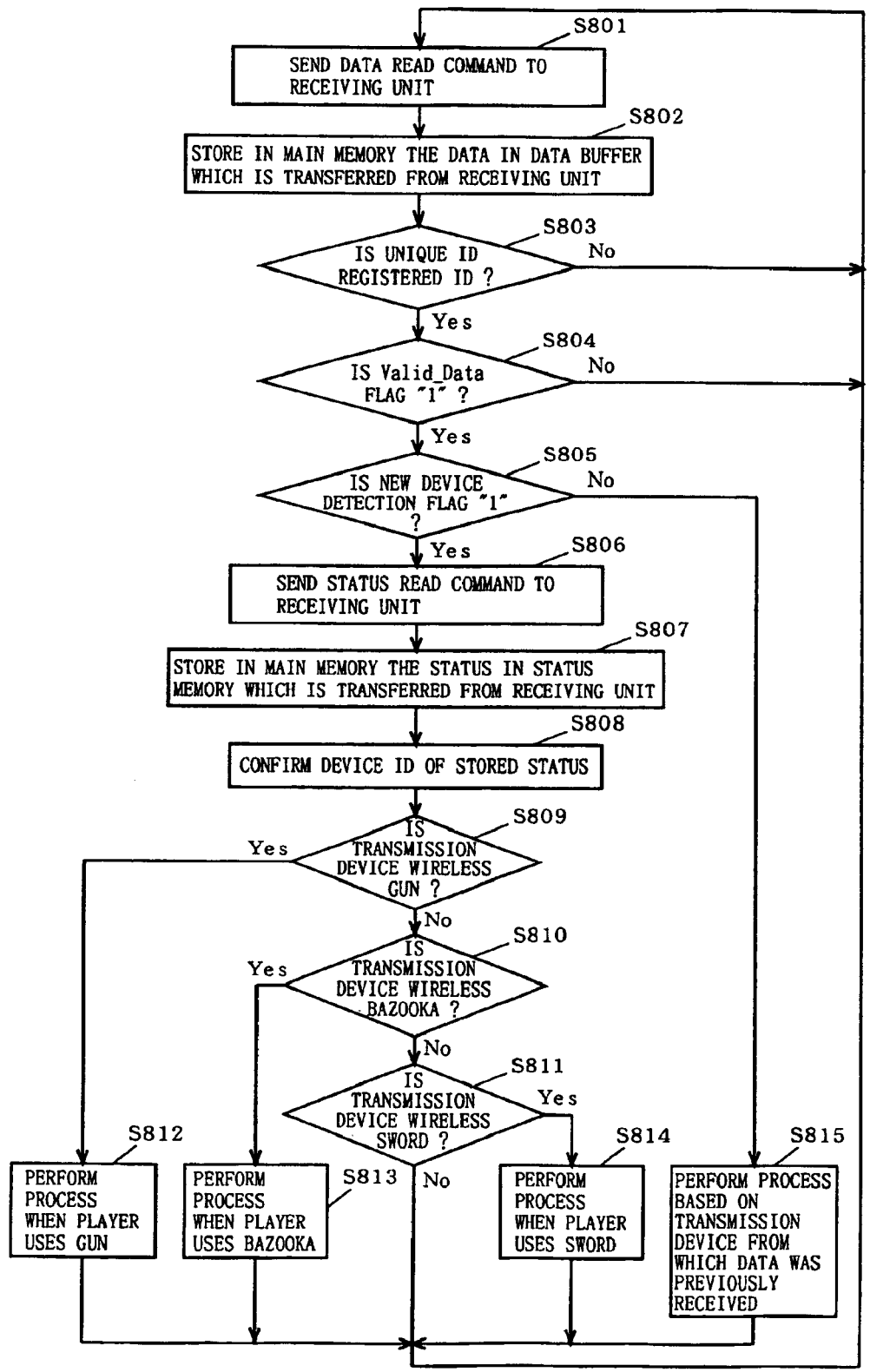
FIG. 17 is a flowchart illustrating an exemplary data read operation of the CPU 62 in an UNFIX mode according to the second embodiment of the present invention.

FIG. 17 is a flowchart illustrating an exemplary data read operation of the CPU 62 in the UNFIX mode. Note that FIG. 17 illustrates the case in which three types of transmission systems 1, i.e., a gun, a bazooka, and a sword, which are compatible with the game machine 60, are used. The CPU 62 sends a data read command to the receiving unit 40 (step S801). Thereafter, the CPU 62 receives data which is transferred from the data buffer 51 in the receiving unit 40 and stores it in the main memory 63 (step S802).

Next, the CPU 62 confirms the unique ID of the stored data (step S803). If the unique ID of the stored data does not coincide with the unique ID registered in the ID memory 67 at step S803, then the CPU 62 determines that data from anywhere but the registered operation device 10 or transmission unit 20 has been received, and sends a new data read command to the receiving unit 40 (step S801). On the other hand, if the unique ID of the stored data coincides with the unique ID registered in the ID memory 67 at step S803, then the Valid_Data flag of the stored data is further confirmed (step S804). If step S804 finds that the Valid_Data flag is "0", then the CPU 62 determines that data from a valid transmission system 1 is not yet received and sends a new data read command to the receiving unit 40 (step S801). On the other hand, if step S804 finds that the Valid_Data flag is "1", then the CPU 62 further confirms the new device detection flag of the stored data (step S805). If step S805 finds that the new device detection flag is "1", then the CPU 62 sends a status read command to the receiving unit 40 (step S806).

Thereafter, the CPU 62 receives a status which is transferred from the status memory 54 in the receiving unit 40, and stores it in the main memory 63 (step S807). Next, the CPU 62 confirms the device ID of the stored status (step S808). Then, the CPU 62 performs a respective process corresponding to the transmission system 1 of the confirmed device ID (step S809 to S814). On the other hand, if step S805 finds that the new device detection flag is "0", then the CPU 62 determines that the data has been received from the same transmission system 1 as the previous one, and performs a process corresponding to that transmission system 1 (step S815).

Thus, in accordance with the information system of the second embodiment of the present invention, not only the effects of the first embodiment are attained, but it is also possible to prevent incorrect operations from other transmission systems because the game machine 60 can be operated by only using an operation device 10 or transmission unit 20 whose IDs have been registered in the game machine 60. Moreover, the procedure for ID registration requires a user to make a number of button operations in accordance with the output display device 70 so as to ensure that the user's operation device 10 or transmission unit 20 will have its IDs registered in the game machine 60, because, if the registration could be completed through a simple operation of the operation device 10, it would be possible for the IDs of another user s transmission system to be erroneously registered.

Although the determination as to whether or not any transmitted data is data from an operation device 10 or transmission unit 20 whose IDs have been registered is made in the game machine 60 according to the present embodiment, it would be possible to previously send information concerning the registered unique/device IDs to the receiving unit 40, and perform the determination in the receiving unit 40.

While the invention has been described in detail, the foregoing description is in all aspects illustrative and not restrictive. It is understood that numerous other modifications and variations can be devised without departing from the scope of the invention.

What is claimed is:

1. An information processing system for receiving and processing data transmitted from a transmission device which wirelessly transmits operation information, comprising:

a receiving device for receiving transmitted data from any said transmission device and outputting the received data, and a processing device for performing a process based on the data outputted from the receiving device, wherein said transmitted data includes:

a system identification code, which is found in said transmission and said processing device, for identifying a type of processing device for which said transmission device is compatible, a device identification code, which is found in said transmission device, for identifying the device type of said transmission device, a unique identification code, which is found in said transmission device, for uniquely identifying said transmission device from any other transmission device of a same type, and operation data which corresponds to the operation information, wherein the receiving device includes:

a receiving section for receiving transmitted data from any said transmission device, a criterion setting section for setting therein a criterion relating at least to a system identification code and device identification code concerning processing of received data, and a determination section for determining whether or not the data received by the receiving section complies with the criterion which is set in the criterion setting section, and only outputting data which complies with the criterion to the processing device, wherein the processing device includes a processing section for performing a process which is in accordance with the operation information based on the data outputted from the receiving device, wherein the receiving device and/or the processing device further includes a criterion changing section for changing the criterion which is set in the criterion setting section, the criterion changing section included in the processing device further includes a control information sending section for sending to the receiving device control information for changing the criterion which is set in the criterion setting section, and wherein when the receiving device and/or the processing device sets in the criterion a system identification code and a device identification code, but not a unique identification, the information processing system accepts as input transmitted data from any transmission device having the set system and device identification codes.

2. The information processing system according to claim 1, wherein the criterion which is set in the criterion setting section is set in such a manner that only data which is in accordance with the processing device is outputted from the determination section.

3. The information processing system according to claim 1, wherein the determination section further determines whether or not the data received by the receiving section complies with the criterion which is set in the criterion setting section, and outputs only data which complies with the criterion to the processing device.

4. The information processing system according to claim 3, wherein the control information sending section sends the control information to the receiving device to ensure that only data which is in accordance with a process to be performed is outputted from the determination section.

5. The information processing system according to claim 3, wherein the receiving section receives via time-sharing the data transmitted from any plurality of said transmission devices, and wherein the control information sending section sends the control information to the receiving device to ensure that the data received by the receiving section via time-sharing is outputted to the processing device.

6. The information processing system according to claim 3, wherein at least information concerning an identification code of the transmission device transmitted as data together with the operation information is set as the criterion in the criterion setting section, and wherein the determination section determines whether or not the identification code contained in the data received by the receiving section and the information concerning the identification code which is set in the criterion setting section satisfy a predetermined relationship.

7. The information processing system according to claim 6, wherein the information concerning the identification code which is set in the criterion setting section is based on the identification code transmitted together with the operation information which is first received by the receiving section.

8. The information processing system according to claim 3, wherein the receiving device further includes a display section for indicating an interfered state in response to a result of the determination by the determination section.

9. The information processing system according to claim 3, wherein the processing device is capable of executing a first program for performing a process which is based on the data transmitted from first said transmission device and a second program for performing a process which is based on the data transmitted from second said transmission device, and wherein the control information sending section sends first control information for setting a criterion corresponding to the first transmission device when the first program is executed by the processing device, and second control information for setting a criterion corresponding to the second transmission device when the second program is executed by the processing device, to the receiving device.

10. The information processing system according to claim 9, wherein the first control information is information for setting one specific said transmission device as the first transmission device, and wherein the second control information is information for setting a specific plurality of said transmission devices as the second transmission devices.

11. The information processing system according to claim 9, wherein the first transmission device which is set by the first control information is of a type different from the type of the second transmission device which is set by the second control information.

12. The information processing system according to claim 3, wherein the receiving device is detachable from the processing device.

13. The information processing system according to claim 3, wherein the transmission device is separable into an inputting section for inputting operation data and a transmission section for generating transmission data from the operation data and wirelessly transmitting the transmission data.

14. An information processing system for receiving and processing data transmitted from a transmission device which wirelessly transmits operation information, comprising:

a receiving device for receiving transmitted data from any said transmission device and outputting the received data, and a processing device for performing a process based on the data outputted from the receiving device, wherein said transmitted data includes:

a system identification code, which is found in said transmission and said processing device, for identifying a type of processing device for which said transmission device is compatible, a device identification code, which is found in said transmission device, for identifying the device type of said transmission device a unique identification code, which is found in said transmission device, for uniquely identifying said transmission device from any other transmission device of a same type, and operation data which corresponds to the operation information, wherein the receiving device includes:
a receiving section for receiving transmitted data from any said transmission device,
a criterion setting section for setting therein a criterion relating at least to a system identification code and device identification code concerning processing of received data, and
a determination section for determining whether or not the data received by the receiving section complies with the criterion which is set in the criterion setting section, and only outputting data which complies with the criterion to the processing device, wherein the processing device includes:
a processing section for performing a process which is in accordance with the operation information based on the data outputted from the receiving device,
an identification code storage section for setting therein an identification code of the transmission device transmitted as data together with the operation information, the identification code being set in the identification code storage section based on a plurality of said operation information,
an identification code determination section for determining whether or not the identification code contained in the data outputted from the receiving device and information concerning the identification code which is set in the identification code storage section satisfy a predetermined relationship, and
a criterion changing section for changing the criterion which is set in the criterion setting section, wherein the criterion changing section further includes a control information sending section for sending to the receiving device control information for changing the criterion which is set in the criterion setting section, wherein the processing section performs a process which is in accordance with the operation information based on data which is among the data outputted from the receiving device and which is determined by the identification code determination section as satisfying the predetermined relationship, and wherein when the receiving device and/or the processing device sets in the criterion a system identification code and a device identification code, but not a unique identification, the information processing system accepts as input transmitted data from any transmission device having the set system and device identification codes.

15. The information processing system according to claim 14, wherein the processing device further includes an operation procedure display section for indicating a procedure of a plurality of operations for deriving the plurality of operation information, and wherein the identification code of the plurality of operation information which comply with the procedure of the plurality of operations indicated by the operation procedure display section is set in the identification code storage section.

16. An information processing system for receiving and processing data transmitted from a transmission device which wirelessly transmits operation information, comprising:

a receiving device for receiving transmitted data from any said transmission device and outputting the received data, and a processing device for performing a process based on the data outputted from the receiving device, wherein said transmitted data includes:
a system identification code, which is found in said transmission and said processing device, for identifying a type of processing device for which said transmission device is compatible,
a device identification code, which is found in said transmission device, for identifying the device type of said transmission device,
a unique identification code, which is found in said transmission device, for uniquely identifying said transmission device from any other transmission device of a same type, and operation data which corresponds to the operation information, wherein the receiving device includes:
a receiving section for receiving transmitted data from any said transmission device,
a criterion setting section for setting therein a criterion relating at least to a system identification code and device identification code concerning processing of received data, and
a determination section for determining whether or not the data received by the receiving section complies with the criterion which is set in the criterion setting section, and only outputting data which complies with the criterion to the processing device, wherein the processing device includes:
a processing section for performing a process which is in accordance with the operation information based on the data outputted from the receiving device,
an identification code storage section for setting therein an identification code of the transmission device transmitted as data together with the operation information, the identification code being set in the identification code storage section based on a plurality of said operation information, and
an operation procedure display section for indicating a procedure of a plurality of operations for deriving the plurality of operation information, wherein the identification code of the plurality of operation information which comply with the procedure of the plurality of operations indicated by the operation procedure display section is set in the identification code storage section, wherein the receiving device and/or the processing device further includes a criterion changing section for changing the criterion which is set in the criterion setting section, wherein the criterion changing section further includes a control information sending section for sending to the receiving device control information for changing the criterion which is set in the criterion setting section, wherein the control information sending section sends the control information with the identification code contained therein to the receiving device, wherein the determination section determines whether or not the identification code contained in the data received by the receiving section and information concerning the identification code contained in the control information satisfy a predetermined relationship, and outputs only data which complies with the relationship to the processing device, and wherein when the receiving device and/or the processing device sets in the criterion a system identification code and a device identification code, but not a unique identification, the information processing system accepts as input transmitted data from any transmission device having the set system and device identification codes.

17. A game system for transmitting and receiving data via wireless communication, comprising:

a game controller for wirelessly transmitting information of a game operation inputted from a user as data, a receiving unit for receiving transmitted data from any said game controller and outputting the received data, and a game apparatus for performing a process based on the data outputted from the receiving unit, wherein said transmitted data includes:

a system identification code, which is found in said game controller and the name apparatus, for identifying a type of game apparatus for which said name controller is compatible, a device identification code, which is found in said game controller, for identifying the device type of said game controller, a unique identification code, which is found in said game controller, for uniquely identifying said game controller from any other same controller of a same type, and operation data which corresponds to said same operation, wherein the game controller includes:

an operation section via which a game operation is inputted by a user, and a transmission unit for wirelessly transmitting as data the information of the game operation inputted to the operation section, wherein the receiving unit includes:

a receiving section for receiving transmitted data from any said transmission unit, a criterion setting section for setting therein a criterion relating at least to a system identification code and device identification code concerning processing of received data, and a determination section for determining whether or not the data received by the receiving section complies with the criterion which is set in the criterion setting section, and only outputting data which complies with the criterion to the game apparatus, wherein the game apparatus includes a processing section for performing a process which is in accordance with information of a game operation based on the data outputted from the receiving unit, wherein the receiving unit and/or the game apparatus further includes a criterion changing section for changing the criterion which is set in the criterion setting section, the criterion changing section included in the game apparatus, further comprising a control information sending section for sending to the receiving unit control information for changing the criterion which is set in the criterion setting section, and wherein when the receiving unit and/or the game apparatus device sets in the criterion a system identification code and a device identification code, but not a unique identification, the game system accepts as input transmitted data from any game controller having the set system and device identification codes.

18. The game system according to claim 17, wherein the criterion which is set in the criterion setting section is set in such a manner that only data which is in accordance with the game apparatus is outputted from the determination section.

19. The game system according to claim 17, wherein the game controller further includes a first identification code storage section for storing an identification code of itself, wherein the transmission unit transmits information concerning the identification code as data, together with the information of the game operation, wherein a criterion concerning processing of received data, with at least the information concerning the identification code being contained in the criterion, is set in the criterion setting section, and wherein the determination section further determines whether or not the identification code contained in the data received by the receiving section and the information concerning the identification code which is set in the criterion setting section satisfy a predetermined relationship, and outputs only data which complies with the criterion to the game apparatus.

20. The game system according to claim 19, wherein the control information sending section sends the control information to the receiving unit to ensure that only data which is in accordance with a game to be performed is outputted from the determination section.

21. The game system according to claim 19, wherein the information concerning the identification code which is set in the criterion setting section is based on the identification code contained in the data which is first received by the receiving section.

22. The game system according to claim 19, wherein the receiving unit further includes a display section for indicating an interfered state in response to a result of the determination by the determination section.

23. The game system according to claim 19, wherein the receiving section receives via time-sharing the data transmitted from any plurality of said transmission units, and wherein the control information sending section sends the control information to the receiving unit to ensure that the data received by the receiving section via time-sharing is outputted to the game apparatus.

24. The game system according to claim 19, wherein the receiving unit is detachable from the game apparatus.

25. The game system according to claim 19, wherein the game controller is separable into the operation section and the first identification code storage section, and the transmission unit.

26. The game system according to claim 19, wherein the game controller is separable into the operation section, and the transmission unit and the first identification code storage section.

27. A game system for transmitting and receiving data via wireless communication, comprising:

a game controller for wirelessly transmitting information of a game operation inputted from a user as data, a receiving unit for receiving transmitted data from any said game controller and outputting the received data, and a game apparatus for performing a process based on the data outputted from the receiving unit, wherein said transmitted data includes:

a system identification code, which is found in said game controller and the game apparatus, for identifying a type of game apparatus for which said game controller is compatible, a device identification code, which is found in said game controller, for identifying the device type of said game controller, a unique identification code, which is found in said game controller, for uniquely identifying said game controller from any other game controller of a same type, and operation data which corresponds to said game operation, wherein the game controller includes:
- an operation section via which a game operation is inputted by a user,
- a transmission unit for wirelessly transmitting as data the information of the game operation inputted to the operation section, and
- a first identification code storage section for storing an identification code of itself, wherein the receiving unit includes:
- a receiving section for receiving transmitted data from any said transmission unit,
- a criterion setting section for setting therein a criterion relating at least to a system identification code and device identification code concerning processing of received data, and
- a determination section for determining whether or not the data received by the receiving section complies with the criterion which is set in the criterion setting section, and only outputting data which complies with the criterion to the game apparatus, wherein the game apparatus includes:
- a processing section for performing a process which is in accordance with the information of the game operation based on the data outputted from the receiving unit,
- a second identification code storage section for setting the identification code therein, the identification code being set in the second identification code storage section based on a plurality of said data outputted from the receiving unit, and
- an identification code determination section for determining whether or not the identification code contained in the data outputted from the receiving unit and information concerning the identification code which is set in the second identification code storage section satisfy a predetermined relationship, wherein the receiving unit and/or the game apparatus further includes a criterion changing section for changing the criterion which is set in the criterion setting section, wherein the criterion changing section further includes a control information sending section for sending to the receiving unit control information for changing the criterion which is set in the criterion setting section, wherein the transmission unit transmits information concerning the identification code as data, together with the information of the game operation, wherein the processing section performs a process which is in accordance with the information of the game operation based on data which is among the data outputted from the receiving unit and which is determined by the identification code determination section as satisfying the predetermined relationship, and wherein when the receiving unit and/or the same apparatus device sets in the criterion a system identification code and a device identification code, but not a unique identification, the game system accepts as input transmitted data from any game controller having the set system and device identification codes.

28. The game system according to claim 27, wherein the game apparatus further includes an operation procedure display section for indicating a procedure of a plurality of operations for deriving the plurality of data, and wherein the identification code of the plurality of data which comply with the procedure of the plurality of operations indicated by the operation procedure display section is set in the second identification code storage section.

29. A game system for transmitting and receiving data via wireless communication, comprising:

a game controller for wirelessly transmitting information of a game operation inputted from a user as data, a receiving unit for receiving transmitted data from any said game controller and outputting the received data, and a game apparatus for performing a process based on the data outputted from the receiving unit, wherein said transmitted data includes:

a system identification code, which is found in said game controller and the game apparatus, for identifying a type of same apparatus for which said game controller is compatible, a device identification code, which is found in said game controller, for identifying the device type of said game controller, a unique identification code, which is found in said game controller, for uniquely identifying said game controller from any other same controller of a same type, and operation data which corresponds to said same operation, wherein the game controller includes:
- an operation section via which a game operation is inputted by a user,
- a transmission unit for wirelessly transmitting as data the information of the game operation inputted to the operation section, and
- a first identification code storage section for storing an identification code of itself, wherein the receiving unit includes:
- a receiving section for receiving transmitted data from any said transmission unit,
- a criterion setting section for setting therein a criterion relating at least to a system identification code and a device identification code concerning processing of received data, and
- a determination section for determining whether or not the data received by the receiving section complies with the criterion which is set in the criterion setting section, and only outputting data which complies with the criterion to the game apparatus, wherein the game apparatus includes:
- a processing section for performing a process which is in accordance with the information of the game operation based on the data outputted from the receiving unit,
- a second identification code storage section for setting the identification code therein, the identification code being set in the second identification code storage section based on a plurality of said data outputted from the receiving unit, and
- an operation procedure display section for indicating a procedure of a plurality of operations for deriving the plurality of data, wherein the identification code of the plurality of data which comply with the procedure of the plurality of operations indicated by the operation procedure display section is set in the second identification code storage section, wherein the receiving unit and/or the game apparatus further includes a criterion changing section for changing the criterion which is set in the criterion setting section, wherein the criterion changing section further includes a control information sending section for sending to the receiving unit control information for changing the criterion which is set in the criterion setting section, wherein the transmission unit transmits information concerning the identification code as data, together with the information of the game operation, wherein a criterion concerning processing of received data, at least containing information concerning the identification code, is set in the criterion setting section, wherein the control information sending section, sends to the receiving unit the control information containing the identification code which is set in the second identification code storage section, wherein the determination section further determines whether or not the identification code contained in the data received by the receiving section and the information concerning the identification code contained in the control information satisfy a predetermined relationship, and outputs only data which complies with the relationship to the game apparatus, and wherein when the receiving unit and/or the game apparatus device sets in the criterion a system identification code and a device identification code, but not a unique identification, the game system accepts as input transmitted data from any game controller having the set system and device identification codes.

* * * * *